(12) United States Patent
Vicari

(10) Patent No.: US 8,466,243 B2
(45) Date of Patent: *Jun. 18, 2013

(54) VINYL ALCOHOL COPOLYMERS FOR USE IN AQUEOUS DISPERSIONS AND MELT EXTRUDED ARTICLES

(75) Inventor: Richard Vicari, Pearland, TX (US)

(73) Assignee: Sekisui Specialty Chemicals America, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/136,102

(22) Filed: Jul. 22, 2011

(65) Prior Publication Data

US 2011/0288229 A1  Nov. 24, 2011

Related U.S. Application Data

(60) Continuation-in-part of application No. 12/806,482, filed on Aug. 13, 2010, now Pat. No. 7,994,265, which is a division of application No. 10/946,970, filed on Sep. 21, 2004, now Pat. No. 7,790,815, which is a continuation-in-part of application No. 10/618,248, filed on Jul. 11, 2003, now Pat. No. 6,818,709.

(51) Int. Cl.
  *C08F 20/00* (2006.01)
  *C08F 12/28* (2006.01)
  *C08F 16/12* (2006.01)
  *C08F 2/00* (2006.01)
  *C08G 85/00* (2006.01)

(52) U.S. Cl.
  USPC .......... 526/303.1; 526/310; 526/330; 526/65; 526/67

(58) Field of Classification Search
  USPC .......... 526/303.1, 310, 330, 65, 67
  See application file for complete search history.

(56) References Cited

U.S. PATENT DOCUMENTS

| 3,556,932 A | 1/1971 | Coscia et at | 162/166 |
| 3,556,933 A | 1/1971 | Williams et al. | 162/167 |
| 3,700,623 A | 10/1972 | Keim | 260/80.3 R |

(Continued)

FOREIGN PATENT DOCUMENTS

| JP | 56-073199 | 6/1981 |
| JP | 62-33241 | * 6/1981 |
| JP | 63-270704 | 11/1988 |

OTHER PUBLICATIONS

English Translation, JP 62-33241 Tohei Moritani et al. Jun. 1981.*

(Continued)

*Primary Examiner* — William Cheung
(74) *Attorney, Agent, or Firm* — Anna L. Kinney; Michael W. Ferrell

(57) ABSTRACT

A sulfonic acid-functionalized vinyl alcohol copolymer is provided which is characterized by a substantial absence of compositional drift. The copolymer is produced by polymerization in two continuously-fed reaction zones such that the ratio of sulfonic acid-containing comonomer fed to the first reaction zone to the sulfonic acid-containing comonomer fed to the second reaction zone is within the range of about 55:45 to about 80:20. The resin is characterized by a resistance to irreversible dehydration upon exposure to harsh chemicals and by retention of hydroxide functionality upon aging. A resin composition comprising a copolymer lacking compositional drift is also provided for preparation of an oil and grease barrier coating, an oxidation resistant water soluble package, or a battery separator.

21 Claims, 13 Drawing Sheets

U.S. PATENT DOCUMENTS

| | | | |
|---|---|---|---|
| 3,772,076 A | 11/1973 | Keim | 117/115 R |
| 4,526,693 A | 7/1985 | Son et al. | 252/8.5 B |
| 4,557,763 A | 12/1985 | George et al. | 106/90 |
| 4,605,702 A | 8/1986 | Guerro et al. | 525/154 |
| 4,626,285 A | 12/1986 | Peiffer et al. | 106/90 |
| 5,051,222 A | 9/1991 | Marten et al. | 264/143 |
| 5,057,570 A | 10/1991 | Miller et al. | 524/503 |
| 5,137,969 A | 8/1992 | Marten et al. | 525/56 |
| 5,223,096 A | 6/1993 | Phan et al. | 162/158 |
| 5,229,029 A | 7/1993 | Colombo | 252/180 |
| 5,262,007 A | 11/1993 | Phan et al. | 162/158 |
| 5,264,082 A | 11/1993 | Phan et al. | 162/158 |
| 5,312,522 A | 5/1994 | Phan et al. | 162/111 |
| 5,340,874 A | 8/1994 | Famili et al. | 525/59 |
| 5,349,023 A | 9/1994 | Ikeda et al. | 525/61 |
| 5,415,737 A | 5/1995 | Phan et al. | 162/111 |
| 5,728,210 A | 3/1998 | Moran et al. | 106/823 |
| 5,850,880 A | 12/1998 | Moran et al. | 166/293 |
| 5,945,457 A | 8/1999 | Plate et al. | 514/772.1 |
| 6,166,117 A | 12/2000 | Miyazaki | 524/291 |
| 6,180,689 B1 | 1/2001 | Moulin | 523/130 |
| 6,609,018 B2 | 8/2003 | Cory et al. | 600/393 |
| 6,620,294 B1 | 9/2003 | Jokinen et al. | 162/162 |
| 6,730,637 B1 | 5/2004 | Stewart et al. | 507/125 |
| 6,752,907 B2 | 6/2004 | Edwards et al. | 162/207 |
| 6,818,709 B1 * | 11/2004 | Vicari | 526/65 |
| 7,044,170 B2 | 5/2006 | Goodwin | 138/176 |
| 7,786,229 B2 | 8/2010 | Vicari | 526/65 |
| 7,790,815 B2 * | 9/2010 | Vicari | 526/65 |
| 7,932,328 B2 | 4/2011 | Vicari | 526/65 |
| 7,994,265 B2 * | 8/2011 | Vicari | 526/65 |
| 2005/0222355 A1 | 10/2005 | Vicari | 526/330 |
| 2006/0099410 A1 | 5/2006 | Miller | 428/341 |
| 2009/0148758 A1 | 6/2009 | Vicari et al. | 429/142 |

OTHER PUBLICATIONS

Chapter 2: Alkaline-Curing Polymeric Amine-Epichlorohydrin, Espy, Wet Strength Resins and Their Application (L. Chan, Editor, 1994); Westfelt, Cellulose Chemistry and Technology vol. 13, p. 813, 1979.

Evans, Chemistry and Industry, Jul. 5, 1969, pp. 893-903; Egan, J. Am. Oil Chemist's Soc., vol. 55 (1978), pp. 118-121; Egan, J. Am. Oil Chemist's Soc., vol. 55 (1978), pp. 118-121.

Trivedi et al., J. Am. Oil Chemist's Soc., Jun. 1981, pp. 754-756; and T. Moritani and I. Yamauchi, "Functional modification of poly(vinyl alcohol) by copolymerization: II. Modification with a sulfonate monomer", Polymer, vol. 39, No. 3, pp. 553-557, 1998.

* cited by examiner

DETAIL A OF FIGURE 5A

DETAIL A OF FIGURE 6A

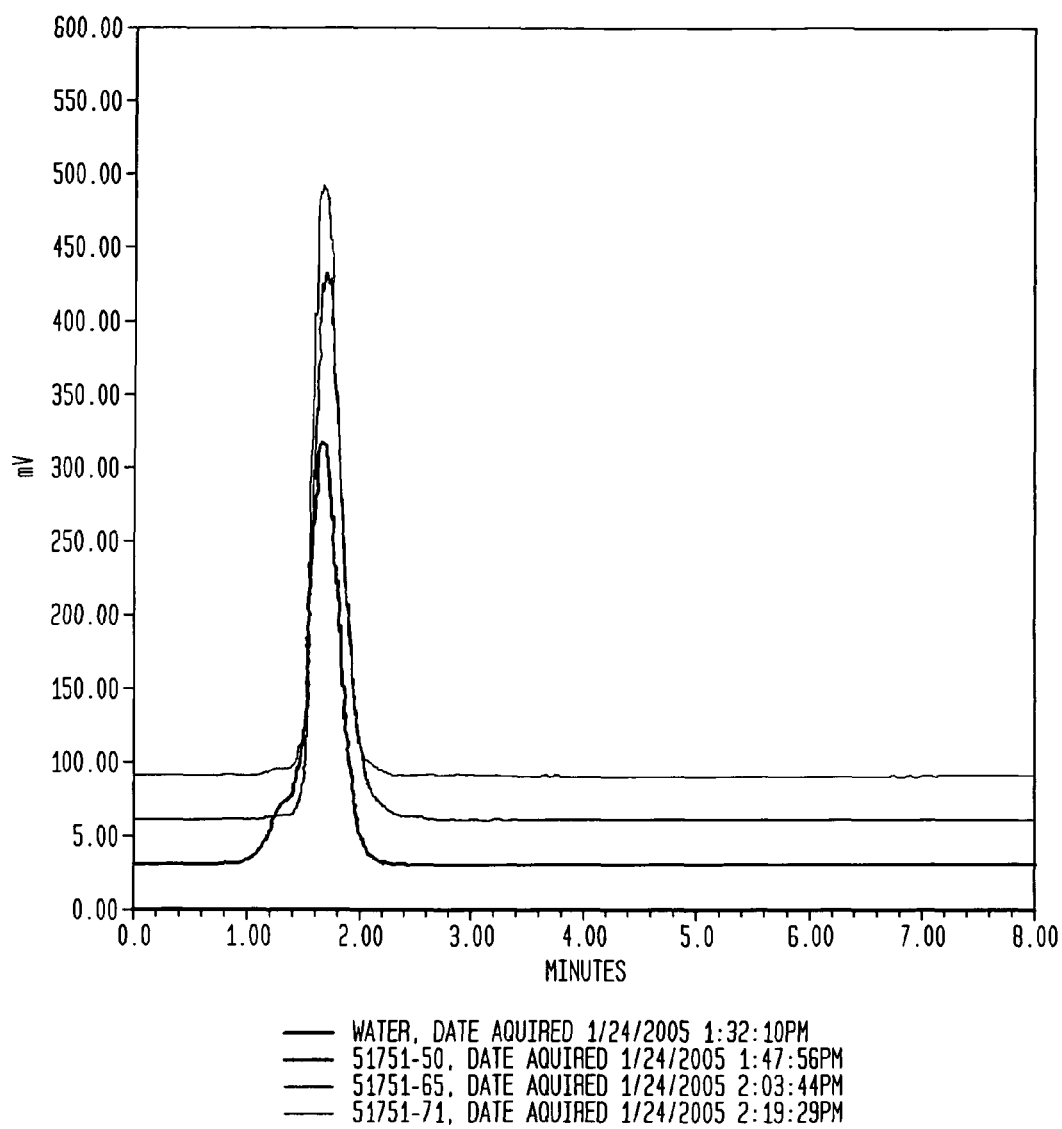

API FLUID LOSS PERFORMANCE VS. VISCOSITY

CLAY SLIP DISPERSION STUDY

VINYL ALCOHOL COPOLYMERS FOR USE IN AQUEOUS DISPERSIONS AND MELT EXTRUDED ARTICLES

CROSS REFERENCE TO RELATED APPLICATION

This application is a continuation in part of U.S. patent application Ser. No. 12/806,482, filed Aug. 13, 2010, entitled "Vinyl Alcohol Copolymers for Use in Aqueous Dispersions and Melt Extruded Articles", now U.S. Pat. No. 7,994,265. U.S. patent application Ser. No. 12/806,482 is a divisional of U.S. patent application Ser. No. 10/946,970, filed Sep. 21, 2004, entitled "Vinyl Alcohol Copolymers for Use in Aqueous Dispersions and Melt Extruded Articles", now U.S. Pat. No. 7,790,815. U.S. patent application Ser. No. 10/946,970 is a continuation-in-part of U.S. patent application Ser. No. 10/618,248 entitled "Production of Vinyl Alcohol Copolymers", filed on Jul. 11, 2003, now U.S. Pat. No. 6,818,709. The priorities of U.S. patent application Ser. No. 12/806,482, U.S. patent application Ser. No. 10/946,970 and U.S. patent application Ser. No. 10/618,248 are hereby claimed and their references incorporated herein in their entireties.

TECHNICAL FIELD

The present invention relates to an improved polyvinyl alcohol copolymer resin having substantially no compositional drift.

DESCRIPTION OF RELATED ART

Copolymers of vinyl alcohol (VOH) with a minor amount of 2-acrylamido-2-methyl propane sulfonic acid in free acid form or as a salt of the free acid (AMPS) are known in the art. A problem with the production of these copolymers by prior art methods is that it is difficult to produce the copolymer with a sufficiently high content of polymerized AMPS while maintaining satisfactory levels of productivity and avoiding compositional drift, i.e., unacceptable variations in the content of AMPS in the copolymer from one batch to the next. Thus, any process which is capable of producing VOH/AMPS copolymers with satisfactory loading of polymerized AMPS, combined with relatively high productivity and low compositional drift, is much to be desired. Due to the difficulty of producing these polymers, they have seen limited commercial application.

The polymers are disclosed in an article by T. Moritani and I. Yamauchi, "Functional modification of poly(vinyl alcohol) by copolymerization: II. Modification with a sulfonate monomer", POLYMER, Vol. 39, No. 3, pp. 553-557, 1998. The reference reports poly(vinyl acetate-co-vinyl alcohol)s copolymerized with sodium 2-acrylamide-2-methyl propane sulfonate (SAMPS), having much lower degrees of hydrolysis than previously used polyvinyl alcohols, are effective as water-soluble polymers. The reference discloses the use of the copolymers for paper sizing, textile sizing, emulsifiers, adhesives and specialty films with high solubility.

Japanese Patent JP 62-33241 (1987), to Moritani et al., as translated into English, teaches vinyl alcohol copolymers prepared by copolymerizing a vinyl ester such as vinyl acetate and an (alk)acrylamidoalkane sulfonic acid or sulfonate, such as 2-acrylamido-2-methyl propane sulfonate, and saponifying the resulting copolymer. The resulting copolymers are characterized by substantial compositional drift.

U.S. Pat. No. 5,340,874, issued to Famili et al. on Aug. 23, 1994, cites Japanese Patent JP 56-73199 as teaching the copolymerization of vinyl acetate with 2-acrylamidopropane sulfonic acid or its metal salts to produce a copolymer which can be saponified to produce a vinyl alcohol polymer with improved flow properties for application in paper coatings, and also cites Japanese Patent JP 63-270,704 as teaching modified polyvinyl alcohols useful as emulsifiers, by copolymerizing N-sulfoalkyl (meth-) acrylamide and a vinyl ester and saponifying the resulting copolymer.

U.S. Pat. No. 5,349,023, issued to Ikeda on Sep. 20, 1994, discloses vinyl alcohol copolymers having a terminal amino group, useful for preparing resin compositions having good gas barrier properties, produced by copolymerizing a vinyl ester such as vinyl acetate with a comonomer such as acrylamide propane sulfonic acid or its salts, at least partially saponifying the resulting copolymer to produce vinyl alcohol units, and reacting the saponified polymer with a primary or secondary amine, or ammonia.

U.S. Pat. No. 5,507,570 issued to Miller et al. on Oct. 15, 1991, discloses high solids, aqueous, pigmented paper coating compositions containing polyvinyl alcohol.

U.S. Pat. No. 6,166,117 issued to Miyazaki on Dec. 26, 2000, teaches water-soluble films of copolymers of vinyl alcohol and an alkali metal salt of 2-acrylamido-2-methylpropanesulfonic acid which may be formed by melt extrusion.

U.S. Pat. No. 5,051,222, issued to Marten et al. on Sep. 24, 1991, and U.S. Pat. No. 5,137,969, issued to Marten et al. on Aug. 11, 1992, disclose processes for the melt extrusion of polyvinyl alcohol.

SUMMARY OF THE INVENTION

In accordance with this invention, a vinyl alcohol copolymer resin is provided consisting essentially of recurring units I, II and III,

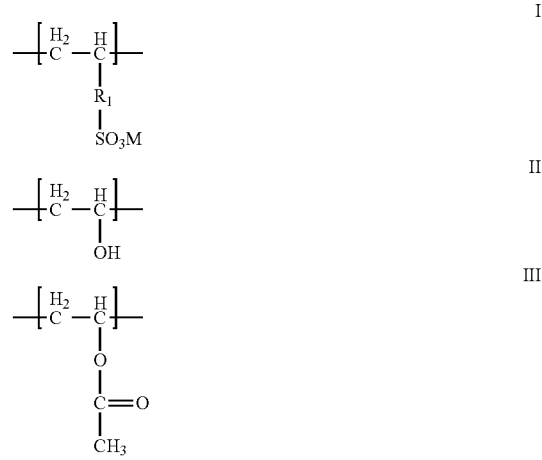

wherein:
$R_1$ is present or absent and if present is $C_1$-$C_{20}$ alkylene, $C_4$-$C_8$ cycloalkylene, $C_4$-$C_8$ heterocycloalkylene, arylene, heteroarylene, or —C(=O)—NH—$R_2$—;
$R_2$ is $C_1$-$C_{10}$ alkylene, $C_4$-$C_8$ cycloalkylene, $C_4$-$C_8$ heterocycloalkylene, arylene, alkylarylene, heteroarylene, or alkylheteroarylene; and
M is a cationic counterion or hydrogen.

The inventive vinyl alcohol copolymer resin is characterized by a substantial absence of compositional drift as determined by $^{13}C$ NMR spectroscopy. Recurring unit I is generally present in the vinyl alcohol copolymer resin in an amount of from about 0.5 to about 10 mole percent. Recurring unit II is generally present in the resin in an amount of from about 75 to about 98 mole percent. Recurring unit III is generally present in an amount of from about 1 to about 20 mole percent. The resin is generally characterized by a degree of hydrolysis of from about 70 to about 99+ %. Typically, a 4 weight % aqueous solution of the resin is characterized by a viscosity of about 2 to about 30 cps.

Most preferably, the saponified resin consists essentially of the following recurring units:

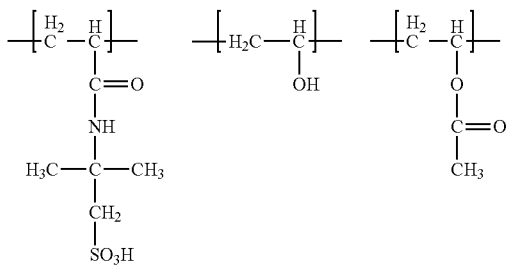

The saponified resin may alternatively consist essentially of the following recurring units:

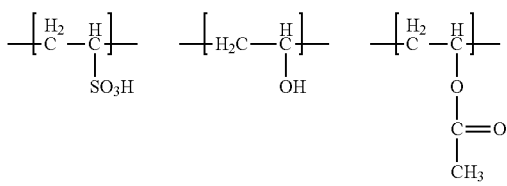

In another alternative embodiment the saponified resin consists essentially of the following recurring units:

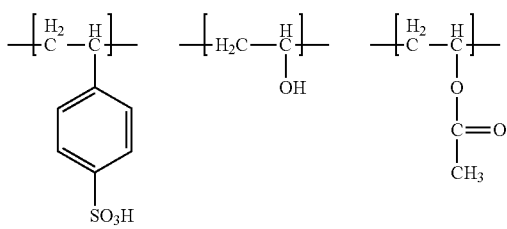

Still other features and advantages will become apparent from the discussion which follows.

BRIEF DESCRIPTION OF DRAWINGS

The invention is described in detail below with reference to the Figures in which:

FIG. 7 presents gradient-elution chromatography (GPEC) analysis of a VOH/AMPS copolymer according to the invention;

DETAILED DESCRIPTION OF THE INVENTION

Figure 1:
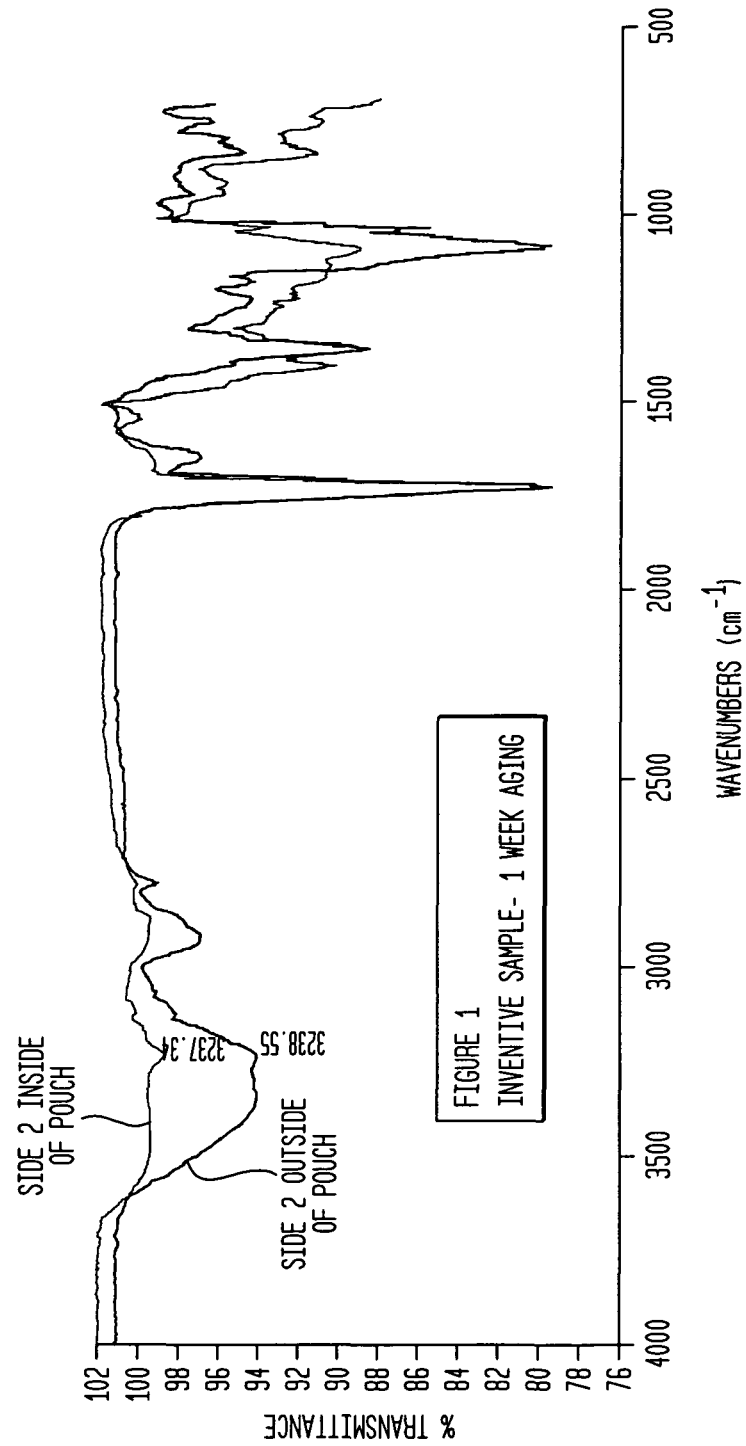
FIG. 1 presents IR spectra of a film made from the inventive resin after 1 week of aging.
Figure 2:
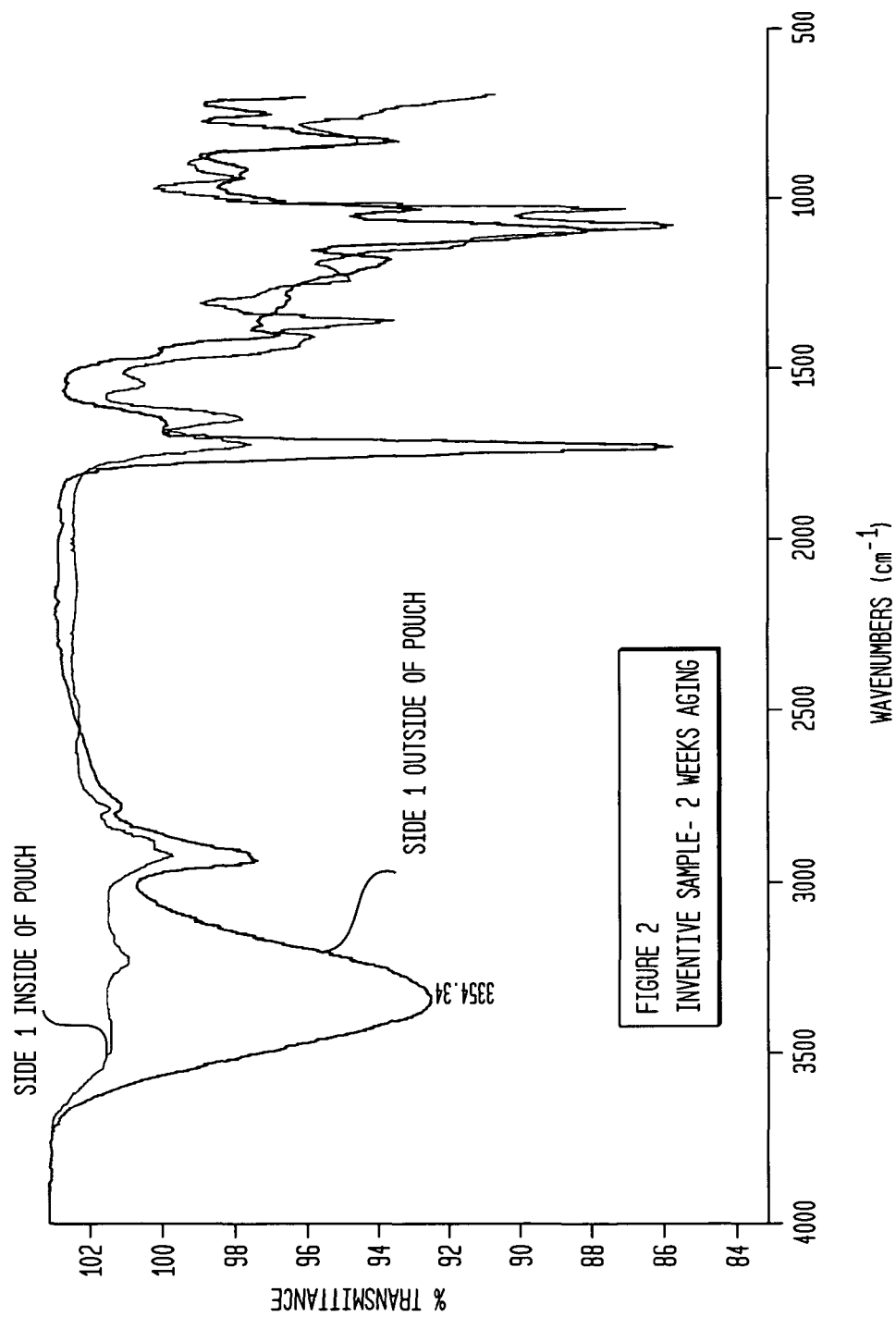
FIG. 2 presents IR spectra of a film made from the inventive resin after 2 weeks of aging.

The invention is described in detail below in connection with numerous embodiments for purposes of illustration, only. Modifications to particular embodiments within the spirit and scope of the invention, set forth in the appended claims, will be readily apparent to those of skill in the art.

As used herein, terminology has its ordinary meaning unless modified or supplemented by definition here. "Percent" and the like means weight percent unless mole or volume percent is specified, while "ppb" is used to designate parts per barrel (oil field applications). In connection with chemical terminology, specific definitions to be used throughout the specification and claims follow.

"Alkylene" means an alkanediylene group commonly having free valencies on two carbon atoms. Non-limiting examples include methylene, ethylene, propylene and the like. The term also means that the alkylene group may be substituted by one or more substituents which may be the same or different, each substituent being independently selected from the group consisting of halo, alkyl, aryl, -cycloalkyl, cyano, hydroxy, alkoxy, alkylthio, amino, —NH(alkyl), —NH(cycloalkyl), —N(alkyl)$_2$, carboxy and —C(O)O-alkyl.

"Alkylarylene" means an alkyl-aryl-group in which the alkylene and arylene are as described herein. Preferred alkylarylenes comprise a lower alkyl group. A non-limiting example of a suitable alkylarylene groups is tolyl. The bond to the parent moiety is through the arylene.

"Alkylheteroarylene" means an alkyl group attached to a parent moiety via a heteroarylene group.

"Arylene" means an aromatic monocyclic or multicyclic ring system comprising about 6 to about 14 carbon atoms, preferably about 6 to about 10 carbon atoms. The arylene group can be unsubstituted or substituted on the ring with one or more substituents which may be the same or different, each being independently selected from the group consisting of alkyl, aryl, —OCF$_3$, —OCOalkyl, —OCOaryl, —CF$_3$, heteroaryl, aralkyl, alkylaryl, heteroaralkyl, alkylheteroaryl, hydroxy, hydroxyalkyl, alkoxy, aryloxy, aralkoxy, acyl, aroyl, halo, haloalkyl, haloalkoxy, nitro, cyano, carboxy, alkoxycarbonyl, aryloxy-carbonyl, aralkoxycarbonyl, alkylsulfonyl, arylsulfonyl, heteroarylsulfonyl, alkylsulfinyl, arylsulfinyl, heteroarylsulfinyl, alkylthio, arylthio, heteroarylthio, aralkylthio, heteroaralkylthio, -cycloalkyl and heterocyclyl. Non-limiting examples of suitable aryl groups include phenyl and naphthyl. The "aryl" group can also be substituted by linking two adjacent carbons on its aromatic ring via a combination of one or more carbon atoms and one or more oxygen atoms such as, for example, methylenedioxy, ethylenedioxy, and the like.

"Cycloalkylene" means a non-aromatic mono- or multicyclic ring system comprising about 3 to about 10 carbon atoms, preferably about 5 to about 10 carbon atoms. Preferred cycloalkylene rings contain about 5 to about 7 ring atoms. The cycloalkylene can be optionally substituted on the ring by replacing an available hydrogen on the ring by one or more substituents which may be the same or different, each being independently selected from the group consisting of alkyl, aryl, heteroaryl, aralkyl, alkylaryl, aralkenyl, heteroaralkyl, alkylheteroaryl, heteroaralkenyl, hydroxy, hydroxyalkyl, alkoxy, aryloxy, aralkoxy, acyl, aroyl, halo, nitro, cyano, carboxy, alkoxycarbonyl, aryloxycarbonyl, aralkoxycarbonyl, alkylsulfonyl, arylsulfonyl, heteroarylsulfonyl, alkylsulfinyl, arylsulfinyl, heteroarylsulfinyl, alkylthio, arylthio, heteroarylthio, aralkylthio, heteroaralkyl-thio, cycloalkyl, cycloalkenyl and heterocyclyl.

"Heteroarylene" means an aromatic monocyclic or multicyclic ring system comprising about 5 to about 14 ring atoms, preferably about 5 to about 10 ring atoms, in which one or more of the ring atoms is an element other than carbon, for example nitrogen, oxygen or sulfur, alone or in combination. Preferred heteroarylenes contain about 5 to about 6 ring atoms. The "heteroarylene" can be optionally substituted on the ring by replacing an available hydrogen on the ring by one or more substituents which may be the same or different, each being independently selected from the group consisting of alkyl, aryl, heteroaryl, aralkyl, alkylaryl, aralkenyl, heteroaralkyl, alkylheteroaryl, heteroaralkenyl, hydroxy, hydroxyalkyl, alkoxy, aryloxy, aralkoxy, acyl, aroyl, halo, nitro, cyano, carboxy, alkoxycarbonyl, aryloxycarbonyl, aralkoxycarbonyl, alkylsulfonyl, arylsulfonyl, heteroarylsulfonyl, alkylsulfinyl, arylsulfinyl, heteroarylsulfinyl, alkylthio, arylthio, heteroarylthio, aralkylthio, heteroaralkylthio, -cycloalkyl, cycloalkenyl and heterocyclyl.

"Heterocycloalkylene" represents a cycloalkylene ring as defined above, having one or more (e.g., 1, 2 or 3) heteroatoms independently selected from: O, S, or —$NR_3$— wherein $R_3$ is selected from: H, alkyl, aryl, heteroaryl, aralkyl (e.g., ar($C_1$ to $C_6$)alkyl), or heteroaralkyl (e.g., heteroar($C_1$ to $C_6$)alkyl.

"Characteristic Viscosity" is defined as the viscosity of a resin measured in a 4% w/w aqueous solution at 20° C.

"Dispersion", "aqueous dispersion" and the like refers to a solution, slurry or a suspension containing at least some undissolved or partially dissolved components such as minerals, cellulosic material and so forth.

"PVOH/AMPS copolymer", "PVOH-co-AMPS" and like terminology means hydrolyzed copolymers of VAM and AMPS as described herein. These polymers preferably have a characteristic viscosity of between about 2 and 20 cps and have an AMPS content of from about 1 mole % to about 5 mole %, most preferably 2 to 4 mole %. A preferred PVOH/AMPS copolymer has a characteristic viscosity of 12 cps and an AMPS content of about 4 mole %.

"Compositional drift" refers to the phenomenon in which the chemical composition of a product varies throughout the reaction, due to different reactivities of multiple monomers, resulting in tendencies of one monomer to enter the chain more rapidly than another. Increased compositional drift in a copolymer results in a copolymer which includes portions devoid of AMPS or SAMPS comonomers. As such, these copolymers lose the benefits in performance achieved by incorporation of the AMPS comonomers, and thus behave essentially identically to PVOH homopolymers when tested for certain characteristics. Thus, polymers with compositional drift have "blockiness" while polymers substantially free of compositional drift have a truly random distribution of monomers. The absence of compositional drift may be determined by $^{13}C$ NMR spectroscopy. In this method, the absence of compositional drift is generally evidenced by the presence of less than about two peaks between about 29 ppm and about 40 ppm on $^{13}C$ NMR spectra. The absence of compositional drift generally may also be determined by gradient elution chromatographic analysis. In this method, the substantial absence of compositional drift is evidenced by a single peak showing a unimodal compositional distribution. Infrared spectrography generally may also be used to show the absence of compositional drift as it relates to retention of hydroxide functionality upon aging, as evidenced by IR spectra showing a peak demonstrating absorption at about 3354 $cm^{-1}$ after two weeks of aging.

"Unimodal compositional distribution" as used herein refers to uniformity and consistency in a copolymer, due to a lack of compositional drift, as evidenced by essentially one peak in gradient elution chromatographic analysis. Importantly, the single peak refers to the analyte and not to any salt and/or solvent peaks in the chromatogram. A copolymer lacking such uniformity and consistency presents multiple peaks in gradient elution chromatographic analysis, and possesses significant compositional drift.

In carrying out the foregoing process the comonomer with VAM may be the free acid form of AMPS or the sodium, potassium, or ammonium salt of such free acid form.

The free radical yielding polymerization initiator utilized for the copolymerization of vinyl acetate (VAc or VAM) and AMPS or salt of AMPS may be, for example, 2-ethylhexyl peroxydicarbonate (Trigonox EHP), 2,2'-azobisisobutyronitrile (AIBN), t-butyl peroxyneodecanoate, bis(4-t-butylcyclohexyl)peroxydicarbonate, di-n-propyl peroxydicarbonate, di-n-butyl peroxydicarbonate, di-cetyl peroxydicarbonate, di-s-butyl peroxydicarbonate. Essentially any initiator able to generate free radicals can be used.

Optionally, acetaldehyde (AcH) as a chain transfer agent can be continuously fed to the first reaction zone with the other components. The amount of AcH may, for example, be up to about 0.2 wt. % based on the total of VAM and AcH being added.

A solvent for the comonomers VAM and AMPS, the polymerization initiator and the copolymer being formed in the two reaction zones is generally employed in the process. Suitable solvents are, for example, methanol, ethanol, and propanol. The preferred solvent is methanol.

The amount of AMPS continuously fed to both reaction zones is, for example, about 1 to about 20 wt. %, preferably about 4 to 15 wt. % based on the total of VAM and AMPS being fed. The "split" or ratio between the amounts of AMPS fed to the first and second reaction zones, respectively, may be, for example, from about 55:45 to about 80:20.

The amount of polymerization initiator fed to the first reaction zone may be, for example, about 0.0001 to about 1 wt. % based on the weight of VAM being fed.

The amount of solvent fed to the first reaction zone may be, for example, about 10 to about 40 wt. % based on the weight of VAM being fed. The polymerization initiator is preferably fed to the first reaction zone as a solution in the solvent at a concentration in the solvent of about 0.1 to about 10 wt. % based on the weight of the solution.

The average residence time in the first reaction zone of the components fed to the first reaction zone may be, for example, in the range of about 30 to about 120 minutes, preferably about 45 to about 70 minutes.

The reaction temperature in the first reaction zone is, for example, about 55 to about 85° C., preferably about 60 to about 80° C.

The average residence time in the second reaction zone of the components in the effluent from the first reaction zone and the additional AMPS fed to the second reaction zone may be, for example, in the range of about 30 to about 120 minutes, preferably about 45 to about 70 minutes.

The reaction temperature in the second reaction zone may be, for example, about 55 to about 85° C., preferably about 60 to about 80° C.

The pressure in each reaction zone may be in the range, for example, of about 1 to about 30 psi, preferably about 3 to about 15 psi.

The residence times and temperatures in the first and second reaction zones are generally sufficient to result in the polymerization of substantially all of the AMPS fed to the system although a small percentage of VAM added to the system may remain unpolymerized.

The polymer solids content in the effluent from the second reaction zone may be, for example, in the range of about 40 to about 85%, preferably about 55 to about 75%, while the percent conversion calculated from actual polymer solids content and the theoretical polymer solids content equal to the amount of monomers added may be in the range of about 70 to about 99%, preferably about 80 to about 98%. The molecular weight of the copolymer from the second reaction zone indicated by the viscosity of a 15 wt. % solution in methanol is in the range, for example, of about 4 to about 200 cps, preferably about 7 to about 30 cps.

In carrying out the saponification step resulting in VOH/AMPS copolymers, the effluent from the second reaction zone may, for example, be fed to a stripping column to remove the more volatile components such as unreacted VAM from the copolymer of VAM and AMPS. The resulting "paste" is then mixed with an aqueous solution of a strong base such as sodium hydroxide, e.g., containing about 10 to about 50 wt. % of sodium hydroxide to provide base at a caustic mole ratio (CMR, ratio of moles of base to moles of acetate in the copolymer) of about 0.01 to about 0.1. Optionally, an amount of a volatile alcohol, e.g., methanol, is also added to reduce the solids content in the paste to within the range of about 30 to about 65 wt. %. The resulting mass is then allowed to react at a temperature from about room temperature (RT, about 22° C.), to about 50° C. for a period, e.g., about 5 minutes to about 24 hours, to obtain a percent hydrolysis of the acetate groups in the copolymer to hydroxyl groups, e.g., in the range of about 70 to about 99+ %, preferably in the range of about 80 to about 95%.

The saponified copolymer of VOH and AMPS may have, for example, about 1 to about 8 mol % of polymerized AMPS (poly AMPS), about 1 to about 20 mol % of polymerized VAM (PVAc) and about 75 to about 98 mol % of polymerized vinyl alcohol (PVOH), preferably about 2 to about 4 mol % of poly AMPS, about 5 to about 10 mol % of PVAc, and about 85 to about 95 mol % of PVOH, a degree of hydrolysis of, for example, about 70 to about 99+ %, preferably about 80 to about 95% as indicated by $C^{13}$NMR, and a relative molecular weight indicated by the viscosity of a 4% aqueous solution of the VOH copolymer of, for example, about 3 to about 30 cps, preferably about 7 to about 10 cps.

EXAMPLES

The following examples further illustrate the invention. Examples 1-11 describe the preparation of copolymers of VAM and the sodium salt of 2-acrylamido-2-methyl propane sulfonic acid (SAMPS) by a continuous process under varying process conditions.

Polymerizations were performed using two jacketed 2-L glass reactors in series fitted with reflux condensers, mechanical stirrers and feed lines. Reactor 1 was fed continuously with vinyl acetate (VAM), which, in some examples, contained acetaldehyde (AcH), methanol containing di(ethylhexyl) peroxy dicarbonate (EHP) initiator, and SAMPS, each as a separate feed line using metering pumps. To ensure accurate feedrates, each feed was placed on a balance and the feedrates checked by measuring the weight difference with time. SAMPS was also fed continuously to the second reactor to minimize compositional drift (the split between Reactor 1 and Reactor 2 was 75:25). Table 1 lists the feedrates and initiator and aldehyde concentrations for the runs. Reactor 1 temperature was 60° C. and Reactor 2 temperature was 64° C. The residence time was 1 hour in each reactor. The polymer solution coming out of Reactor 2 was fed into an Oldershaw column to remove residual vinyl acetate using methanol vapors. Each run was 12 hours long to ensure the polymerization was lined-out.

TABLE 1

Feedrates for the Continuous Polymerization Runs

| | Concentration (wt. %) | | Feedrate, g/min | | |
|---|---|---|---|---|---|
| Example | % EHP in MeOH | % AcH in VAM | VAM + AcH | SAMPS | MeOH + EHP |
| 1 | 4.11 | 0 | 15.69 | 1.08 | 5.73 |
| 2 | 6.98 | 0 | 16.63 | 2.29 | 3.58 |
| 3 | 1.41 | 0 | 15.07 | 2.08 | 5.53 |
| 4 | 4.11 | 0 | 14.97 | 2.06 | 5.46 |
| 5 | 4.11 | 1.96 | 15.07 | 2.04 | 5.39 |
| 6 | 2.44 | 0 | 17.66 | 1.22 | 3.62 |
| 7 | 2.44 | 1.96 | 16.84 | 2.28 | 3.38 |
| 8 | 1.41 | 1.96 | 15.89 | 1.07 | 5.53 |
| 9 | 6.98 | 1.96 | 17.6 | 1.19 | 3.71 |
| 10 | 3.51 | 0.99 | 16.25 | 1.66 | 4.59 |
| 11 | 3.51 | 0.99 | 16.25 | 1.66 | 4.59 |

Table 2 indicates the results from the polymerization of SAMPS with vinyl acetate in the examples, including relative molecular weight of the polymer indicated by the viscosity of a 15% solution in methanol, the actual percentage of solids in Reactor 2 and the percent conversions calculated from the actual percent solids and theoretical percent solids.

TABLE 2

Results From the Polymerization of SAMPS With Vinyl Acetate

| Example | 15% viscosity, cps | Actual Reactor 2 solids | Theoretical solids | Conversion |
|---|---|---|---|---|
| 1 | 7.3 | 72.4% | 74% | 97.84% |
| 2 | 8.9 | 79.80% | 83.65% | 95.4% |
| 3 | 13.5 | 70% | 75% | 93% |
| 4 | 7.3 | 68.40% | 74.89% | 91.33% |
| 5 | 5.1 | 65.80% | 75.24% | 87.45% |
| 6 | 15.7 | 77.60% | 83.63% | 92.79% |
| 7 | 8.8 | 69.70% | 84.41% | 82.57% |
| 8 | 7.2 | 63% | 74.96% | 84.04% |
| 9 | 6.3 | 77.30% | 83.40% | 92.59% |
| 10 | 7 | 70.20% | 79.07% | 88.78% |
| 11 | 7.8 | 70.80% | 79.07% | 89.55% |

Table 2 shows the overall conversion of vinyl acetate and SAMPS into polymer. Based on these theoretical solids levels, which are directly related to the conversion of monomers to copolymer, the conversions range from 83% to 98%. No residual SAMPS was detected by $C^{13}$NMR in any of the runs.

Saponification of the VAM/SAMPS copolymers was accomplished by treating the paste obtained from the Oldershaw column used to strip VAM from the effluent from Reactor 2 with 50 wt. % aqueous NaOH at various values of caustic mole ratio (CMR) further diluted with methanol so that the solids content was 35 wt. %. Examples 12-17 illustrate the effect of varying conditions of saponification carried out on the VAM/SAMPS copolymer of Example 3, with the results shown in Table 3.

TABLE 3

Saponification of PVAc-AMPS

| Example | CMR | Time of saponification, hours | Temp of saponification, °C. | % hydrolysis | Target hydrolysis, % |
|---|---|---|---|---|---|
| 12 | 0.035 | 17 | RT | 96.45 | 99 |
| 13 | 0.045 | 17 | 40 | Ca. 97 | 99 |
| 14 | 0.03 | 17 | RT | 95.80 | 95 |
| 15 | 0.01 | 2 | RT | 84.62 | 88 |
| 16 | 0.01 | 2 | RT | 81.40 | 88 |
| 17 | 0.015 | 2.5 | RT | 92.60 | 88 |

RT = room temperature

Caustic mole ratio (CMR) was calculated with the assumption that the polymer is 100% PVAc. The small amount of co-AMPS was ignored in the CMR calculation.

As stated, the 50% NaOH was diluted with enough MeOH when added to the paste to dilute the solids to 35%. The NaOH/MeOH was mixed into the paste by hand (10 to 20 min. of mixing) at room temperature. The 40° C. saponification (i.e., Example 13) gelled after about 1 minute of mixing. The paste was then allowed to react for the time and temperature shown in the above table. Saponification procedures similar to those described in Examples 12-17 were carried out on the polymers of Examples 1-11.

Table 4 shows the compositions and properties of the saponified polymers for each of the examples of Tables 1 and 2 including mol percents of polymerized SAMPS (SAMPS), polymerized VAM (PVAc) and polymerized vinyl alcohol (PVOH), degree of hydrolysis indicated by $C^{13}$NMR, relative molecular weight as indicated by the viscosity of a 4% solution in water and degree of hydrolysis indicated by titration.

$C^{13}$NMR spectroscopy was used to determine the copolymer composition and the randomness of the SAMPS in the copolymer. The SAMPS feedrate was the only variable to control the SAMPS loading in the copolymer.

The data in Tables 1-4 indicate that copolymers of VOH and AMPS can be obtained at relatively high AMPS loadings, high conversion rates and productivity, high degree of hydrolysis and relatively low compositional drift, using the continuous process of this invention.

More generally, the invention includes a continuous process for making vinyl acetate/acrylamide or acrylamide derivative copolymers. Acrylamide or acrylamide derivative monomers and copolymers incorporating them are referred to herein as acrylamido comonomers and acrylamido copolymers, respectively, for purposes of convenience.

The polymers prepared as above are superior additives and film formers for a variety of applications including drilling fluids, hydraulic cement compositions, pigment compositions, papermaking furnishes and so forth. Their performance and suitability for use in a broad range of aqueous dispersions is due, in part, to enhanced salt stability as noted below. It has also been found that the resins are suitable for melt extrusion into water soluble films and shaped articles.

Characteristics of Resin

Many characteristics of the inventive, truly random, resin are surprisingly dramatically improved as compared to resins containing "blocky" copolymers having substantial compositional drift, as described in more detail below.

The resins of the invention are particularly useful for making dissolvable packaging or packets of harsh chemicals, such as detergents or swimming pool chemicals. Unlike PVOH homopolymer or copolymers of the prior art, the films of the invention maintain their solubility in water and provide a convenient mode of packaging and delivering such chemicals, while reducing spillage and avoiding skin contact, which is particularly important when handling harsh chemicals.

In one embodiment, an inherent novel property of the inventive resin can be determined by a "harsh chemical dissolution test method." The "harsh chemical dissolution test method" is defined as the time required for a film formed from the inventive resin to dissolve completely (no film evident in slide frame or beaker) prepared by the following: a) "film preparation method;" b) "pouch containing harsh chemical preparation method;" and then the film is tested by the following c) "water solubility test method". The inherent novel property of the inventive resin, when made into a film, in one embodiment, has a harsh chemical dissolution time of less

TABLE 4

Composition of Copolymer and Final Viscosity

| | Composition of Saponified Polymer by $C^{13}$NMR | | | | Final Results | |
|---|---|---|---|---|---|---|
| Example | SAMPS, mol % | PVAc, mol % | PVOH mol % | Degree of hydrolysis, %($C^{13}$NMR) | 4% viscosity, cps | Degree of hydrolysis, % (titration) |
| 1 | 1.31 | 4.44 | 94.25 | 95.5 | 3.92 | 95.65 |
| 2 | 2.87 | 2.48 | 94.65 | 97.45 | 4.37 | 96.68 |
| 3 | 3.39 | 2.46 | 94.15 | 97.46 | 5 | 98.91 |
| 4 | 3.42 | 1.52 | 95.06 | 98.43 | 3.94 | 96.24 |
| 5 | 3.12 | 2.42 | 94.46 | 97.5 | 2.59 | 98.41 |
| 6 | 1.48 | 2.09 | 95.53 | 96.96 | 6.11 | 97.43 |
| 7 | 2.83 | 2.23 | 94.94 | 97.7 | 3.71 | 98.37 |
| 8 | 1.6 | 1.26 | 97.14 | 98.72 | 3.58 | 98.91 |
| 9 | 1.54 | 1.31 | 97.15 | 98.67 | 2.97 | 98.72 |
| 10 | 2.03 | 1.79 | 96.18 | 98.17 | 3.53 | 98.47 |
| 11 | 2.07 | 2.45 | 95.48 | 97.49 | 3.78 | 97.85 | than about 100 seconds or about 80 seconds measured by the harsh chemical dissolution test method after 2 weeks, more specifically, less than about 50 seconds, more specifically, less than about 40 seconds, and more specifically, less than about 25 seconds.

Film Preparation Method

An aqueous solution of polymer (i.e. 4% polymer by weight) is made by dissolving the polymer in water. The aqueous solution is cast onto a glass plate and allowed to dry. The resulting film (2-3 mil thick) is peeled off the plate and placed into a controlled humidity, i.e. 50% RH, and temperature, i.e. at 70° F., room for 24 hours. The film is then cut into 2.5×3.5 cm pieces. It should be noted that no additional additives are used in making the film (e.g. propyl gallate).

Pouch Containing Harsh Chemical Preparation Method

A pouch is made in conditions having a temperature of 67.6° F. and 36.5% humidity. The film, made by the above "film preparation method," is cut into 6"×3" pieces and folded in half to make a 3"×3" square. 3 sides of the square are heat-sealed using a hand held heat-sealing gun. 25 g of the tradename "Super Shock It" ("HTH" brand-54.6% calcium hypochlorite, 45.4% other ingredients, 53% available chlorine) are added to the pouch. In some cases, the pouch contents may alternatively comprise another material such as, for example, trichloroisocyanuric acid, where specified. The fourth side of the pouch is sealed.

Water Solubility Test Method

After 8 weeks, or other time period where specified, 3 filled and 2 control pouches from each material are tested. The filled pouches are cut open and the contents removed. A 2.3×3.4 cm film specimen from each side of the pouch is fixed in a slide frame. A beaker is filled with 400 ml DI water and stirred at 400 rpm. The water temperature is maintained at 21° C.+/−1° C. The specimen is immersed in the water and the time required for the film to dissolve completely (no film evident in slide frame or beaker) is recorded. The average time, in seconds, for the 3 filled pouches is the time for the "harsh chemical dissolution test method after 8 weeks" where the number of weeks of the test is specified.

The following is an example of a product made by the process of the present invention that is tested by the "harsh chemical dissolution test method" discussed above. Films formed from the resins of the invention exhibited a harsh chemical dissolution time of less than about 80 seconds measured by the harsh chemical dissolution test method after 8 weeks, while a comparative film, produced in a method consistent with the disclosure of Japanese Publication JP 621887-33241 to Moritani et al., became insoluble after only 6 days.

TABLE 5

Harsh Chemical Dissolution Test Results

| | Dissolution (sec) |
|---|---|
| Week 1 Testing | |
| Inventive Sample, side 1 | 35 |
| Inventive Sample, side 2 | 66 |
| Comparative Sample, side 1 | >600 |
| Week 2 Testing | |
| Inventive Sample, side 1 | 80 |
| Inventive Sample, side 2 | 43 |
| Comparative Sample, side 1 | >600 |

As the data shows, the comparative film became insoluble after only one week, and remained insoluble after a second week. In contrast, the inventive film remained soluble even two weeks after exposure. It is likely that the inventive sample would retain solubility even after eight weeks. The insolubility of the comparative film is thought to result from the irreversible dehydration of the film via loss of —OH functionality, rendering the film insoluble.

Figure 3:
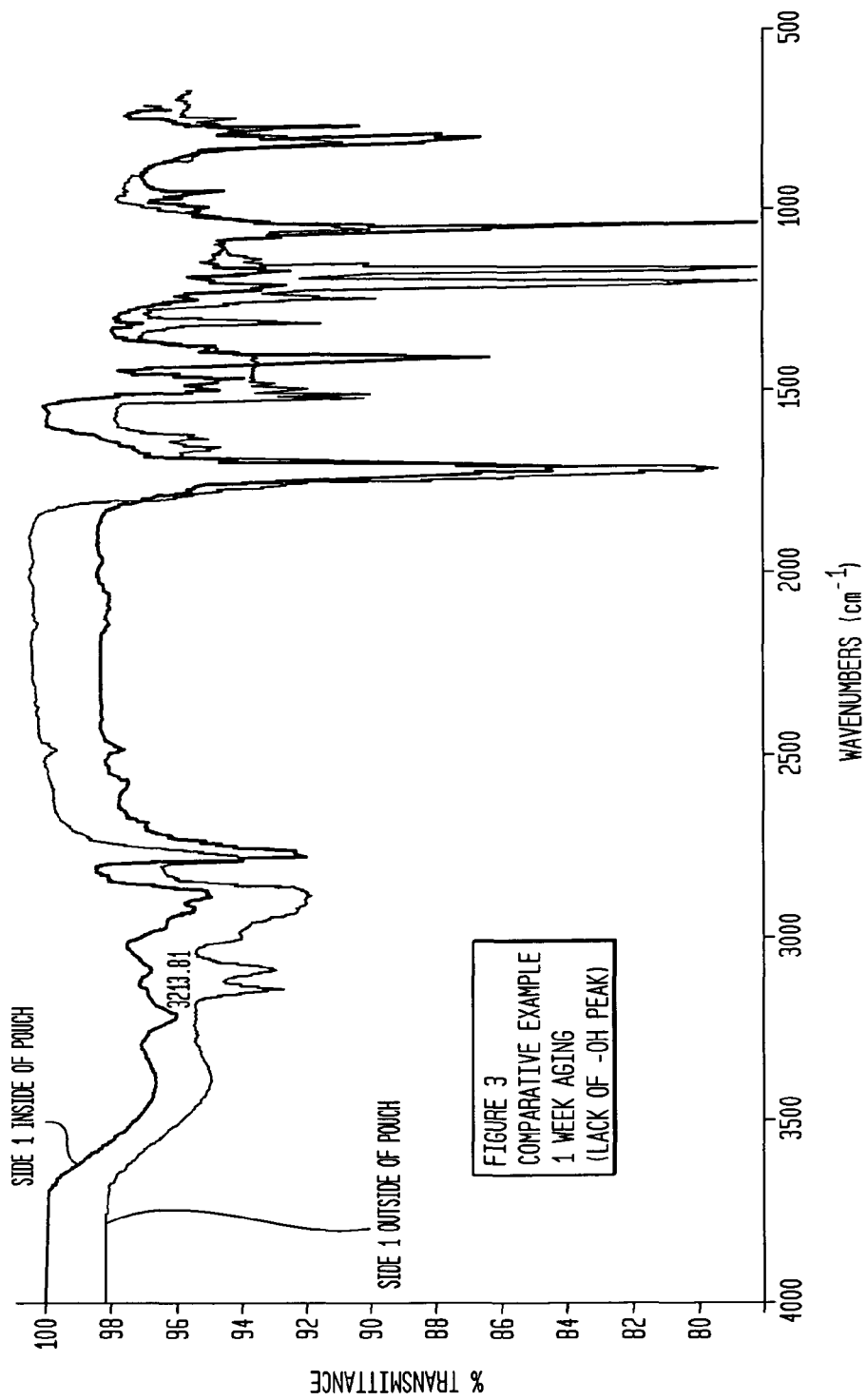
FIG. 3 presents IR spectra of a film made from a comparative resin after 1 week of aging.
Figure 4:
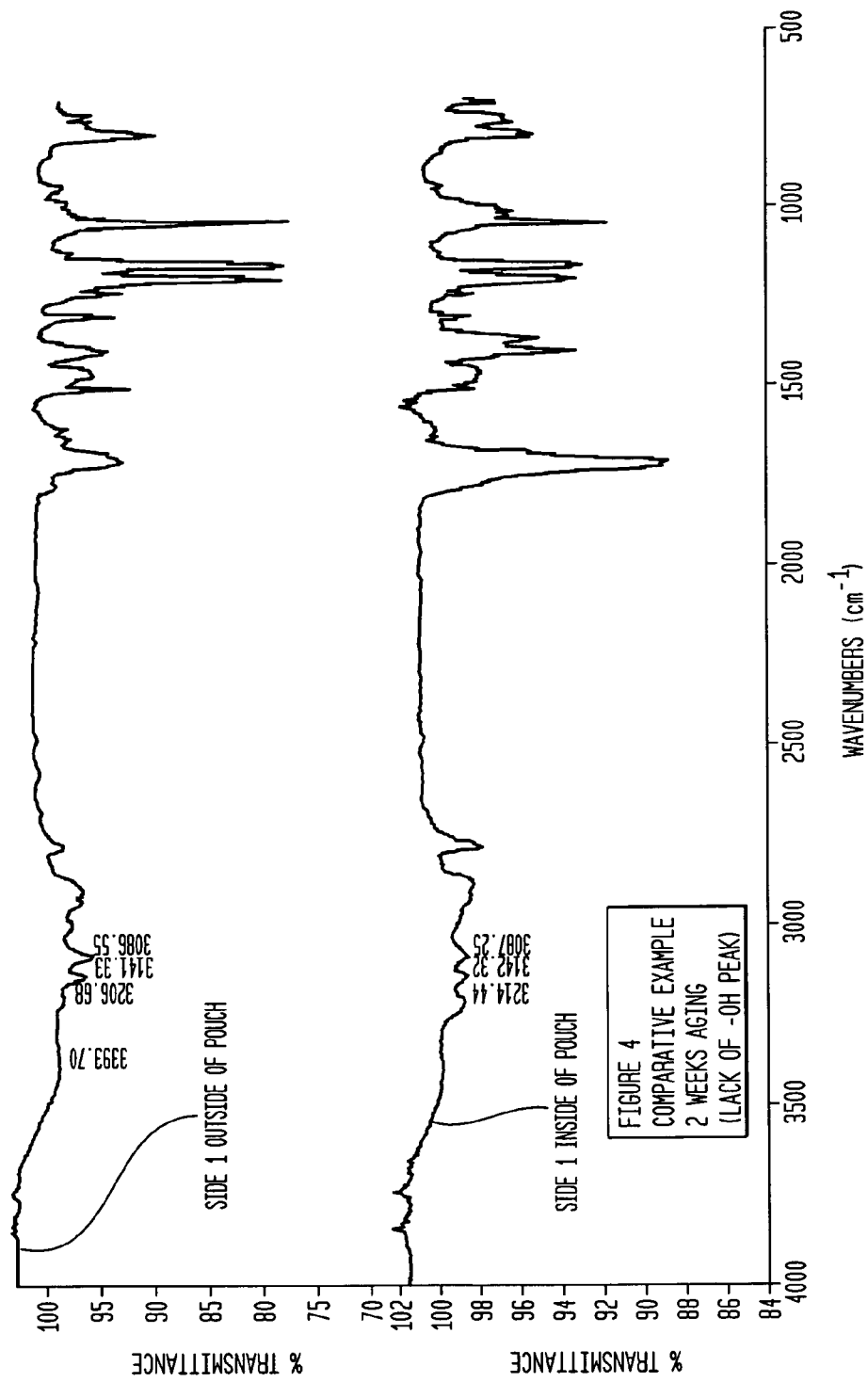
FIG. 4 presents IR spectra of a film made from the comparative resin after 2 weeks of aging.

This loss of —OH functionality by the comparative polymer is confirmed by the loss of hydroxyl groups from the film, as demonstrated in the IR spectra of FIGS. 1-4, wherein the —OH absorption centering around 3354 cm$^{-1}$ is present in the outer side of the invention film after 1 and 2 weeks of aging (FIGS. 1 and 2), but which is not present in the comparative film after 1 and 2 weeks of aging (FIGS. 3 and 4).

As the data show, the proposed dehydration of the comparative film does occur, and results in a non-soluble film, much like a vinyl alcohol homopolymer. In view of this reaction being non-reversible, the comparative film will not spontaneously become soluble again (i.e., regain the alcohol functionality) upon subsequent aging once this functionality is lost. In other words, it is shown that the comparative film becomes insoluble after 1 or 2 weeks and one of skill in the art would conclude that the film will remain insoluble based on this data and based on the fact that the comparative film is insoluble after 2 weeks as measured in the harsh chemical dissolution test method discussed above and in the above-noted application.

Figure 5A:
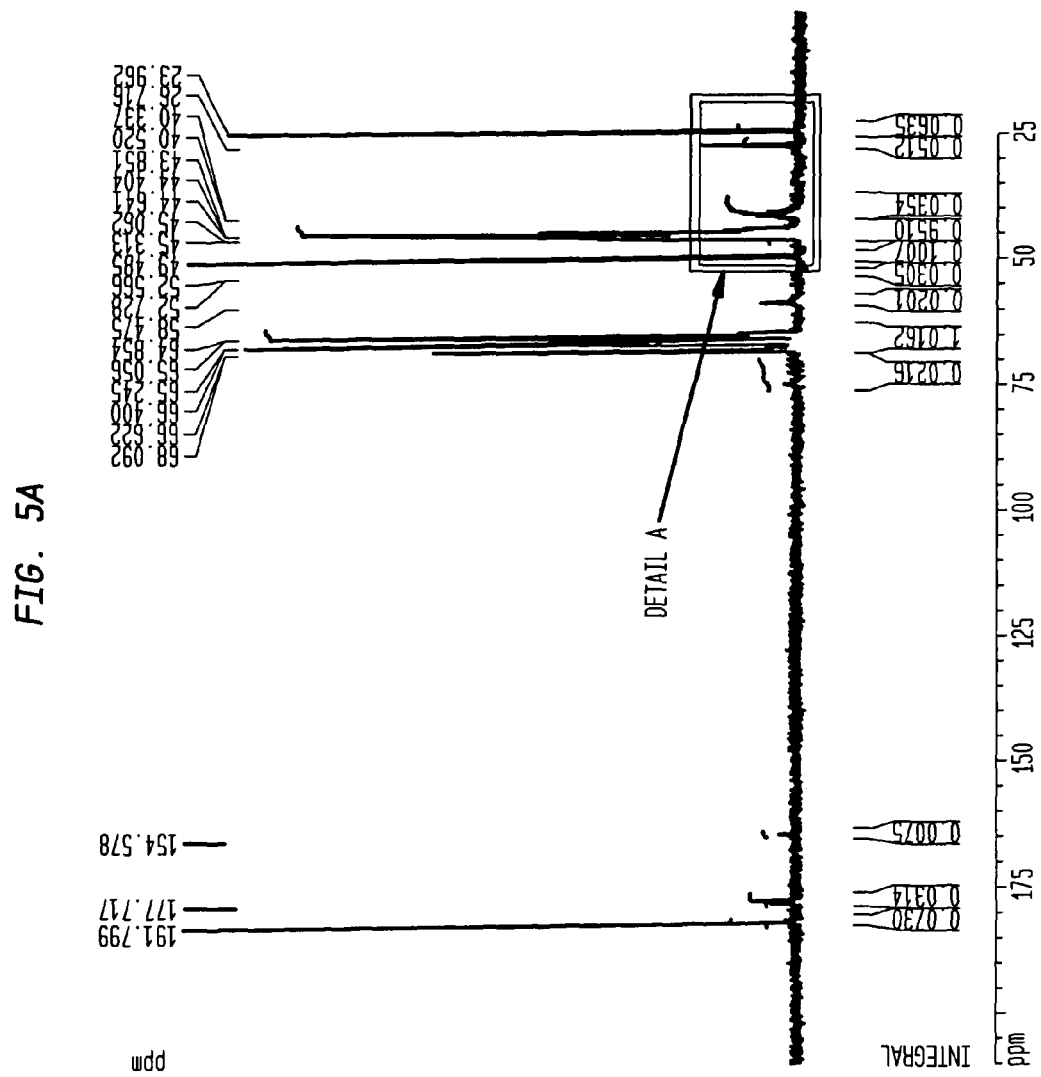
FIG. 5A presents $^{13}C$ NMR spectra of the inventive resin.
Figure 5B:
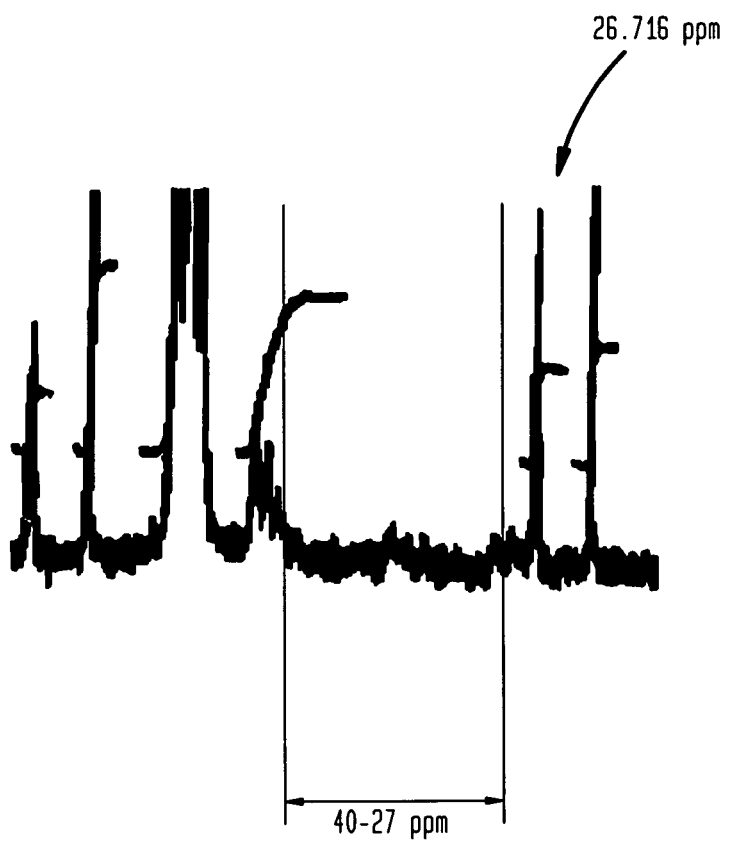
FIG. 5B is a detailed excerpt of the spectra of FIG. 5A.
Figure 6A:
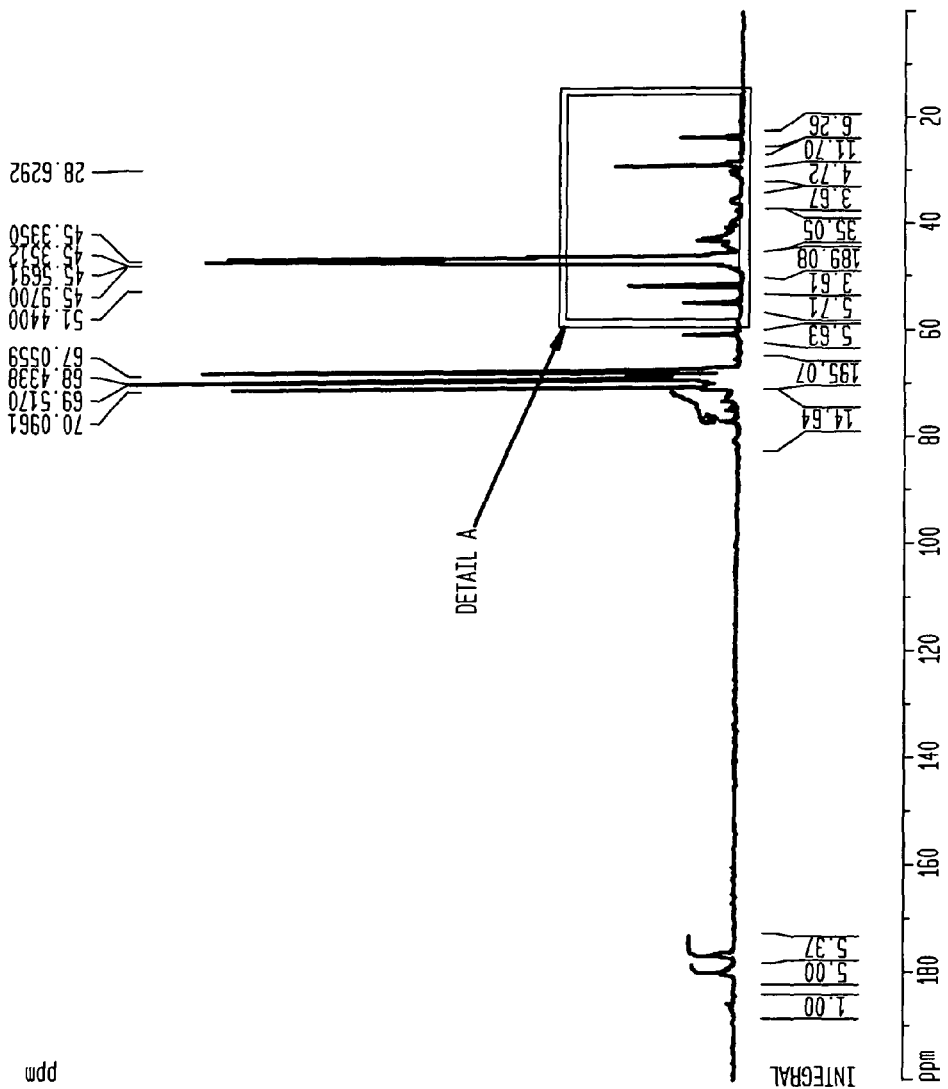
FIG. 6A presents $^{13}C$ NMR spectra of a comparative resin.
Figure 6B:
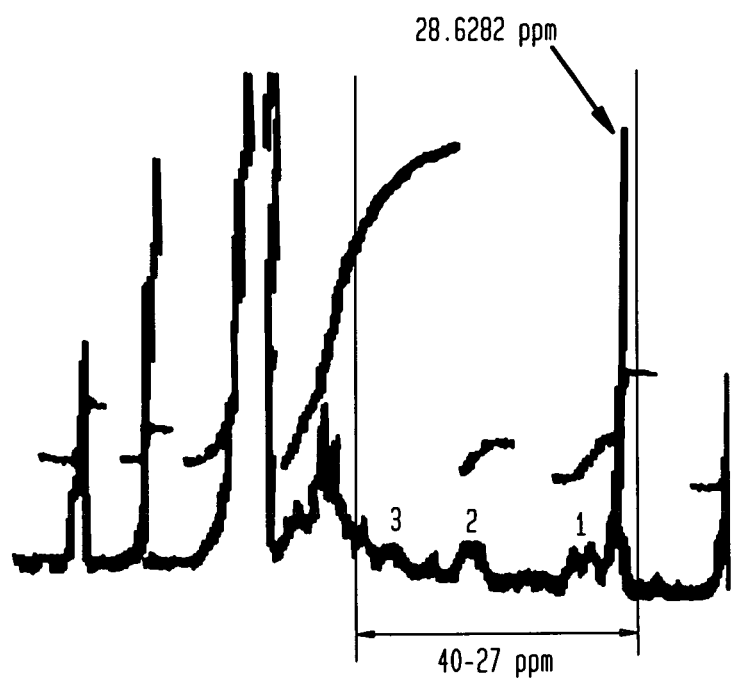
FIG. 6B is a detailed excerpt of the spectra of FIG. 6A.

Further evidence of compositional drift in the prior art polymer and lack of compositional drift in the inventive resin is seen in the actual $^{13}$C NMR spectra and the computer generated $^{13}$C NMR spectra which confirm the actual spectra. Actual $^{13}$C NMR is presented in FIGS. 5A through 6B. The measured $^{13}$C NMR spectrum of the copolymer used in the present invention is shown in FIG. 5A and FIG. 5B. It is seen in these figures that the spectrum of the inventive resin has a substantially flat region in the range of from 29-40 ppm, with perhaps at most 1 peak in this region; note the detail, FIG. 5B. These data may be compared to the spectrum of a comparative saponified copolymer of PVOH and AMPS produced via a semi-batch process in accordance with the process disclosed by Moritani et al., the NMR spectra of which is shown in FIGS. 6A and 6B. In the detail shown in FIG. 6B, there appears to be at least 3; perhaps 5 or more peaks in the range of 29-40 ppm, indicating the presence of nuclei having chemical shifts in this region.

In FIG. 5A, the invention resin spectrum, the peak at 23.682 ppm is assigned to NaOAc, and serves as a marker in the spectrum from which the relative determinations may be made. The peak at 26.716 ppm is assigned to the methyl carbons identified with an * in the following copolymer structure:

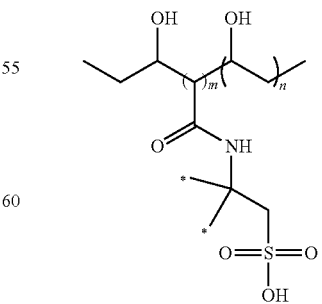

As shown in Detail A (FIG. 5B), the spectrum in FIG. 5A is essentially flat between 29 and 40 ppm.

In FIGS. 6A, 6B (NMR spectra of the comparative copolymer), the peak at 28.6282 ppm corresponds to the methyl peak at 26.716 ppm in FIGS. 5A, 5B. The difference in these chemical shifts is readily understood to result from minor changes in concentration, solvent strength, and other factors. As the FIG. 6B detail shows, there exist peaks in areas labeled 1, 2, and 3 in FIG. 6B at a chemical shift between 29 and 40 which are not present in FIGS. 5A, 5B; with perhaps multiple peaks in this spectral region.

The presence of peaks at 1, 2, and 3 between about 29 ppm to about 40 ppm in the $^{13}C$ spectrum indicate the lack of uniformity and consistency in the comparative copolymer (i.e., a higher compositional drift) which result from non-random inclusion of the AMPs monomer in the polymer backbone as is readily understood with reference to the theoretical shift values discussed below. Increased compositional drift in the comparative copolymer results in a copolymer which includes portions devoid of AMPS comonomers. As such, these comparative copolymers lose the benefits in performance achieved by incorporation of the AMPs polymer, particularly solubility and thus behave essentially identical to PVOH homopolymers when tested for solubility.

The differences in the spectra of the random copolymer of the present invention and the comparative copolymer are appreciated by considering the $^{13}C$ NMR values generated by commercially available software and comparing those values with FIGS. 5B, 6B discussed above. Utilizing ACD/Labs™ for Chemistry version 1.0 (Advanced Chemistry Development, Inc., Toronto, Canada) the structures appearing below were analyzed and evaluated for Carbon 13 NMR chemical shifts associated with the numbered carbons. All relevant carbons having a calculated chemical shift between 29 and 40 ppm are included, representative nuclei with shifts outside of this range are also included. Results appear in the tables following each structure:

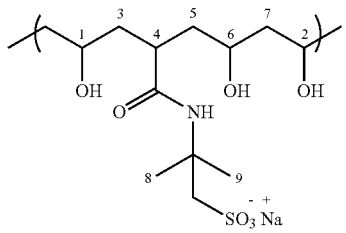

CoAmps - Random Copolymer of Invention

TABLE 6

CoAmps-R Chemical Shifts

| Carbon No. | CHn | Chem. Shifts | Conf. Limits |
|---|---|---|---|
| 1 | CH | 71.01 | 0.2 |
| 2 | CH | 69.24 | 7.1 |
| 3 | $CH_2$ | 40.41 | 5.9 |
| 4 | CH | 36.65 | 6.3 |
| 5 | $CH_2$ | 42.36 | 2.8 |
| 6 | CH | 67.01 | 3.4 |
| 7 | $CH_2$ | 45.47 | 2 |
| 8 | $CH_3$ | 28.23 | 6.1 |
| 9 | $CH_3$ | 28.23 | 6.1 |

It is seen that in the random copolymer, there is only 1 nucleus having chemical shift value between 29 and 40 ppm, slightly upfield from the methyl carbons of the AMPS units.

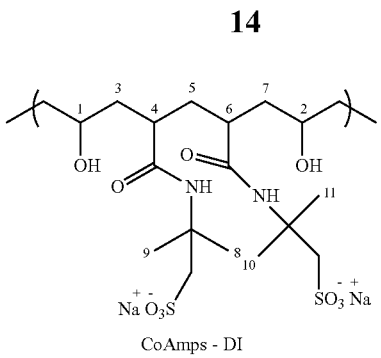

CoAmps - DI

TABLE 7

CoAmps-Di Chemical Shifts

| Carbon No. | CHn | Chem. Shifts | Conf. Limits |
|---|---|---|---|
| 1 | CH | 71.01 | 0.2 |
| 2 | CH | 71.01 | 0.2 |
| 3 | $CH_2$ | 39.6 | 6.9 |
| 4 | CH | 36.87 | 6.4 |
| 5 | $CH_2$ | 40.84 | 9.1 |
| 6 | CH | 36.87 | 6.4 |
| 7 | $CH_2$ | 39.6 | 6.9 |
| 8 | $CH_3$ | 28.23 | 6.1 |
| 9 | $CH_3$ | 28.23 | 6.1 |
| 10 | $CH_3$ | 28.23 | 6.1 |
| 11 | $CH_3$ | 28.23 | 6.1 |

It is seen in the non-random copolymer with adjacent AMPS units, there are 4 nuclei having a shift value slightly upfield from the methyl carbons of the AMPS units, with 2 of those units being near 40 ppm.

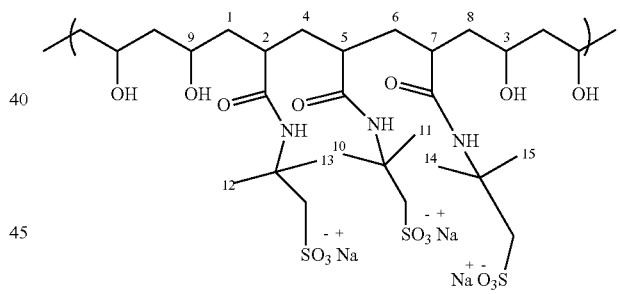

CoAmps - Block

TABLE 8

Co Amps-Block-Chemical Shifts

| Carbon No. | CHn | Chem. Shifts | Conf. Limits |
|---|---|---|---|
| 1 | $CH_2$ | 40.33 | 5.9 |
| 2 | CH | 37.13 | 6.4 |
| 3 | CH | 66.78 | 3.4 |
| 4 | $CH_2$ | 29 | 6 |
| 5 | CH | 37.35 | 6.5 |
| 6 | $CH_2$ | 29 | 6 |
| 7 | CH | 37.13 | 6.4 |
| 8 | $CH_2$ | 40.33 | 5.9 |
| 9 | CH | 66.78 | 3.4 |
| 10 | $CH_3$ | 28.23 | 6.1 |
| 11 | $CH_3$ | 28.23 | 6.1 |
| 12 | $CH_3$ | 28.23 | 6.1 |
| 13 | $CH_3$ | 28.23 | 6.1 |

TABLE 8-continued

Co Amps-Block-Chemical Shifts

| Carbon No. | CHn | Chem. Shifts | Conf. Limits |
|---|---|---|---|
| 14 | $CH_3$ | 28.23 | 6.1 |
| 15 | $CH_3$ | 28.23 | 6.1 |

It is seen in the block copolymer that there are 5 nuclei having shifts slightly upfield from the methyl carbons of the AMPS units.

The theoretical calculations above predict only one nucleus having a chemical shift in the 29 to 40 ppm range at 36.6 ppm for a random copolymer without substantial compositional drift, that is, without adjacent 2-acrylamido-2-methylpropanesulfonate monomer units in the polymer backbone. This is confirmed in FIG. 5B for the invention copolymer which shows at most one peak in this range at about 36 ppm consistent with the calculations.

On the other hand, the theoretical calculations predict numerous peaks at chemical shifts of from 29 to 40 ppm when there are adjacent AMPs units, or blocky copolymer, as is seen in FIG. 6B.

There are numerous peaks at chemical shifts between 29 and 40 ppm in the prior art copolymer, in at least 3 areas and perhaps including 2 or more at each area. According to theory, peaks slightly upfield of the peaks due to the methyl nuclei of the AMPS unit correspond to the presence of adjacent polymer backbone units of 2-acrylamido-2-methylpropanesulfonate and/or block copolymer. These peaks in the spectrum are due to a tendency of 2-acrylamido-2-methylpropanesulfonate monomer units to preferentially react with each other and indicate substantial compositional drift. The remarkable correlation between the observed spectra and the theoretical calculations confirms that the invention copolymer is relatively, indeed substantially, free of compositional drift while the prior art copolymer has substantial compositional drift due to preferential incorporation of 2-acrylamido-2-methylpropanesulfonate monomer units in the polymer backbone.

FIG. 7 provides results of Gradient Polarity Elution Chromatography (GPEC) analysis of a polyvinyl alcohol/AMPS copolymer according to the invention. Three samples of the same polymer are represented in this figure to show reproducibility of results. The single peak at about 1.7 minutes demonstrates the uniform composition of this copolymer, a feature that is only achievable with a truly random copolymer.

Gradient Polarity Elution Chromatography (GPEC) analyzes copolymers by separating polymers that differ in composition as they respond to variation in introduced solvent. Liquid chromatography is a separation technique in which the sample is forced through a packed column. The analyte is carried through the column by a liquid solvent called an eluent. In gradient elution, the composition of the eluent is gradually changed from one solvent to another solvent. For example, the initial solvent may be water, and increasing amounts of an organic solvent, such as acetonitrile or THF, may be added until the composition of the solvent is essentially all organic solvent. Elution describes the emergence of chemicals from the column of a chromatograph. As the composition of the solvent changes, portions of the sample dissolve, depending on their composition, and elute from the column. Thus, the presence of two discernable peaks in a comparative gradient elution chromatographic analysis indicates a copolymer mass having more than one composition, and thus having varying polarities. The different polymer compositions respond differently to the solvent introduced, which is varied over time. This difference in composition indicates a lack of uniformity and consistency in the copolymer (i.e., a higher compositional drift) which results from non-random inclusion of the AMPS monomer in the polymer backbone.

Salt Stability

A series of solutions were prepared and tested for stable solubility in brines such as are encountered in oil field applications or other dispersions. Stability of the polymer solute to salt is important in a variety of applications. The 4% AMPS VOH/AMPS copolymer performed better than Celvol® VAM homopolymers as is seen from the data which follows. Celvol® 513 is 86-89% hydrolyzed and has a Characteristic Viscosity of 13-15; Celvol® 540 is 87-89% hydrolyzed and has a Characteristic Viscosity of 45-55.

Details of testing appear in the tables which follow.

Oil Field Brines in General

TABLE 9

General Oil Field Brine Testing Procedure
0.1 lb polymer/bbl = 0.29 g polymer/L 100 mL of brine solution was added to a glass jar and stirred with a magnetic stirrer (300 rpm). The following solutions were made:
7 wt % Celvol 540
15.2 wt % VOH/AMPS Copolymer
8.9 wt % Celvol 513
Added the polymer solutions drop wise to the brine solutions and stirred at room temperature.

TABLE 10

Salt Solubility

| | | 26% NaCl brine | 26% KCl brine | 31% Halide brine | 37% Sodium Formate brine |
|---|---|---|---|---|---|
| 0.1 lb/bbl | VOH/AMPS Copolymer | s | s | s | x |
| | Celvol ® 513 | x | x | x | x |
| | Celvol ® 540 | x | x | x | x |
| 0.2 lb/bbl | VOH/AMPS Copolymer | s | s | s | x |
| | Celvol ® 513 | x | x | x | x |
| | Celvol ® 540 | x | x | x | x |
| 0.3 lb/bbl | VOH/AMPS Copolymer | x | s | s | x |
| | Celvol ® 513 | x | x | x | x |
| | Celvol ® 540 | x | x | x | x |
| 0.4 lb/bbl | VOH/AMPS Copolymer | x | s | x | x |
| | Celvol ® 513 | x | x | x | x |
| | Celvo ® 540 | x | x | x | x |
| 0.5 lb/bbl | VOH/AMPS Copolymer | x | x | x | x |
| | Celvol ® 513 | x | x | x | x |
| | Celvol ® 540 | x | x | x | x | s = soluble
x = not soluble

The Celvols precipitated on contact. VOH/AMPS Copolymer, when added as a solution, would dissolve in the lower concentration brines Seawater Procedure for Seawater Testing: Made 5 wt % solutions of VOH/AMPS Copolymer, Celvol® 513 and Celvol® 540. Each solution was put into separate glass jars and stirred using a magnetic stirrer at 450 to 550 rpm. The test was conducted at room temperature. Sea salt (aquarium salt) was added in small portions to each solution and the results recorded.

TABLE 11

Sea Salt Stability

| Sea Salt | VOH/AMPS Copolymer Addition (g) | Time to Dissolve (min) | 513 Addition (g) | Time to Dissolve (min) | 540 Addition (g) | Time to Dissolve (min) |
|---|---|---|---|---|---|---|
| | 0.4740 | 0:10 | 0.3867 | 21:31 | 0.2350 | not soluble |
| | 0.5926 | 2:43 | 0.3404 | 7:49 | | |
| | 0.5521 | 2:28 | 0.4106 | 18:59 | | |
| | 0.6400 | 6:58 | 0.3230 | 40:00 | | |
| | 0.3057 | 3:51 | 0.3407 | 41:00 | | |
| | 0.4644 | 5:48 | 0.7212 | 31:00 | | |
| | 0.7364 | 3:21 | — | — | | |
| | 0.9912 | 45:00 | — | — | | |
| Total | 4.7564 | | 2.5226 | | | |
| Solution wt (5 wt %) | 75.00 | | 75.00 | | | |
| grams of polymer | 3.75 | | 3.75 | | | |
| Ending solution ratio | | | | | | |
| Wt % polymer | 4.7 | | 4.8 | | | |
| Wt % salt | 6.0 | | 3.3 | | | |

Not only did the VOH/AMPS Copolymer show better solubility but also it took less time to dissolve the salt into the solution.

Specific Salts

Procedure for Specific Salts: Made 5 wt % solutions of VOH/AMPS Copolymer, Celvol 513 and Celvol 540. 75 g of each solution was put into separate glass jars and stirred with a magnetic stirrer at 450 to 550 rpms. The test was conducted at room temperature. Each salt was added in small portions to each solution and the results recorded.

TABLE 12

NaCl Stability

| NaCl | VOH/AMPS Copolymer Addition (g) | Time to Dissolve (min) | 513 Addition (g) | Time to Dissolve (min) | 540 Addition (g) | Time to Dissolve (min) |
|---|---|---|---|---|---|---|
| | 0.9855 | 0:15 | 1.0497 | 12:00 | 1.0473 | 10:00 |
| | 1.0274 | 0:15 | 1.0600 | 12:00 | 0.9922 | 12:00 |
| | 1.0668 | 0:30 | 1.0360 | 8:00 | 1.051 | 15:00 |
| | 1.0382 | 0:30 | 1.8068 | 8:00 | 1.016 | 20:00 |
| | 1.0711 | 0:30 | 1.0375 | 20:00 | 1.243 | 20:00 |
| | 0.9944 | 0:30 | 0.9671 | 15:00 | 1.1328 | 13:00 |
| | 0.9683 | 0:30 | | | | |
| | 1.1828 | 0:50 | | | | |
| | 1.1380 | 0:50 | | | | |
| Total | 9.4725 | | 6.9571 | | 6.4823 | |
| Solution wt (5 wt %) | 74.56 | | 75.61 | | 74.23 | |
| grams of polymer | 3.728 | | 3.78 | | 3.71 | |
| Ending solution ratio | | | | | | |
| wt % polymer | 4.4 | | 4.6 | | 4.6 | |
| wt % salt | 11.3 | | 8.4 | | 8.0 | |

TABLE 13

KCl Stability

| KCl | VOH/AMPS Copolymer Addition (g) | Time to Dissolve (min) | 513 Addition (g) | Time to Dissolve (min) | 540 Addition (g) | Time to Dissolve (min) |
|---|---|---|---|---|---|---|
| | 1.0532 | 0:20 | 1.0593 | 5:00 | 1.2947 | 10:00 |
| | 1.0699 | 0:25 | 0.9630 | 6:00 | 1.1258 | 10:00 |
| | 1.1024 | 0:50 | 1.1129 | 5:00 | 1.2235 | 12:00 |
| | 1.1761 | 0:50 | 1.1096 | 6:00 | 1.3129 | 10:00 |

TABLE 13-continued

KCl Stability

| KCl | VOH/AMPS Copolymer | | 513 | | 540 | |
|---|---|---|---|---|---|---|
| | Addition (g) | Time to Dissolve (min) | Addition (g) | Time to Dissolve (min) | Addition (g) | Time to Dissolve (min) |
| | 1.1757 | 0:50 | 1.1253 | 5:00 | 1.1005 | 11:00 |
| | 1.1142 | 0:50 | 1.1605 | 8:00 | 1.0888 | 11:00 |
| | 1.1517 | 0:50 | 1.1670 | 8:00 | | |
| | 1.1242 | 1:30 | | | | |
| | 1.1799 | 2:00 | | | | |
| | 1.1422 | 2:00 | | | | |
| | 1.1514 | 2:00 | | | | |
| | 1.1566 | 2:00 | | | | |
| | 1.113 | 2:00 | | | | |
| Total | 14.7105 | | 6.5306 | | 7.1462 | |
| Solution wt (5 wt %) | 74.61 | | 75.61 | | 74.23 | |
| grams of polymer Ending solution ratio | 3.7305 | | 3.78 | | 3.71 | |
| wt % polymer | 4.2 | | 4.6 | | 4.6 | |
| wt % salt | 16.5 | | 8.0 | | 8.8 | |

TABLE 14

KCl Results

With each addition of KCl the Celvol material would precipitate then redissolve. The VOH/AMPS Copolymer material did not precipitate. After sitting overnight, the Celvol 513 material developed 2 layers; the others did not.

TABLE 15

NaBr Stability

| NaBr | VOH/AMPS Copolymer | | 513 | | 540 | |
|---|---|---|---|---|---|---|
| | Addition (g) | Time to Dissolve (min) | Addition (g) | Time to Dissolve (min) | Addition (g) | Time to Dissolve (min) |
| | 1.0743 | 0:40 | 1.0375 | 0:20 | 1.0741 | 0:20 |
| | 1.1307 | 0:20 | 1.1207 | 0:20 | 1.2856 | 0:20 |
| | 1.3696 | 0:20 | 1.3853 | 0:20 | 1.3941 | 0:25 |
| | 1.0677 | 0:25 | 1.0571 | 0:25 | 1.2050 | 0:25 |
| | 1.0802 | 0:25 | 1.1923 | 0:25 | 1.1344 | 0:25 |
| | 1.2445 | 0:25 | 1.1918 | 0:25 | 1.2070 | 0:25 |
| | 1.2680 | 0:20 | 1.2645 | 0:20 | 1.2602 | 0:20 |
| | 1.3168 | 0:30 | 1.3631 | 0:25 | 1.3566 | 0:25 |
| | 1.0718 | 0:40 | 1.1192 | 0:25 | 1.0198 | 0:25 |
| | 1.1333 | 0:35 | 1.1680 | 0:45 | 1.1281 | 0:30 |
| | 1.2240 | 0:25 | 1.2190 | 0:25 | 1.1995 | 0:25 |
| | 1.6747 | 0:40 | 1.2304 | 0:30 | 1.0786 | 0:30 |
| | 1.1744 | 0:30 | 1.2587 | 0:30 | 1.1840 | 0:30 |
| | 1.1873 | 0:40 | 2.1185 | 0:35 | 0.8637 | 0:35 |
| | 2.8492 | 0:25 | 2.8487 | 0:25 | 2.1995 | 1:00 |
| Total | 19.8665 | | 20.5748 | | 18.5902 | |
| Solution wt (5 wt %) | 75.00 | | 75.78 | | 74.50 | |
| grams of polymer Ending solution ratio | 3.75 | | 3.79 | | 3.73 | |
| wt % polymer | 4.0 | | 3.9 | | 4.0 | |
| wt % salt | 20.9 | | 21.4 | | 20.0 | |

TABLE 16

NaBr Results

No precipitate formed with NaBr additions. The solution remained clear through-out the entire addition of NaBr. This is very different compared to the other salts.

TABLE 17

Sodium Formate Stability

| Sodium Formate | VOH/AMPS Copolymer | | 513 | | 540 | |
|---|---|---|---|---|---|---|
| | Addition (g) | Time to Dissolve (min) | Addition (g) | Time to Dissolve (min) | Addition (g) | Time to Dissolve (min) |
| | 1.0557 | 4:20 | 1.0019 | 10:00 | 1.0676 | 10:00 |
| | 0.5377 | 6:00 | 0.5227 | 9:00 | 0.5285 | 8:00 |
| | 0.5249 | 5:00 | 0.5175 | 10:00 | 0.5454 | 10:00 |
| | 1.0283 | 6:00 | 1.0413 | 10:00 | 1.0567 | 10:00 |
| | 1.0757 | 6:00 | 1.0219 | 11:00 | 1.0331 | 15:00 |
| | 1.0636 | 6:00 | | | | |
| | 1.1584 | 11:00 | | | | |
| | 1.1650 | 20:00 | | | | |
| Total | 7.6093 | | 4.1053 | | 4.2313 | |
| Solution wt (5 wt %) | 74.99 | | 75.82 | | 75.11 | |
| grams of polymer Ending solution ratio | 3.75 | | 3.79 | | 3.76 | |
| wt % polymer | 4.5 | | 4.7 | | 4.7 | |
| wt % salt | 9.2 | | 5.1 | | 5.3 | |

TABLE 18

Sodium Formate Results

With each addition of sodium formate all materials formed a precipitate then redissolve. Time to dissolve depended greatly on the size of the precipitated particles. All the polymers were most sensitive to this salt.

The polymers of the invention exhibit superior resistance to brine and are thus suitable for oil field and other applications where brines are encountered.

Drilling Fluid

Drilling fluids for oilfield applications fulfill a variety of requirements, satisfying oftentimes potentially conflicting performance criteria, such a low fluid loss and high lubricity. A drilling fluid performs the following functions: removes cuttings from the bottom of the hole and carries them to the surface; holds cuttings and weight material in suspension when circulation is interrupted; releases sand and cuttings at the surface; walls the hole with an impermeable cake; minimizes adverse effects upon the formation; cools and lubricates the bit and drill string; supports part of the weight of the drill stem and casing; controls subsurface pressure; transmits hydraulic horsepower; maximizes down hole information obtained; transmits electronic data from down hole tools; and helps preserve and protect the drill string and casing. To this end, the fluids contain many components, including dissolved salts which can adversely affect fluid loss additives. Also, different fluids may operate best at different pH values which can also affect stability of the fluid composition. Temperature requirements can be quite demanding, requiring that a component maintain properties at elevated temperatures. U.S. Pat. No. 4,526,693 to Sun et al. and U.S. Pat. No. 6,730,637 to Stewart et al. disclose drilling fluids. Generally speaking, a drilling fluid of this invention includes a polyvinyl alcohol-sulfonic acid resin of the invention in a composition as a fluid loss additive or other modifier to the drilling composition with other suitable components. In some embodiments, the composition may include, in any combination, (i) weighting agents such as barite, hematite, calcium carbonate, galena, siderite and mixtures thereof, to adjust the density of the drilling fluid; (ii) an organophilic clay such as hectorite, bentonite and mixtures thereof as a viscosifier and gelling agent; (iii) lime; and (iv) emulsifiers and wetting agents such as surfactants, ionic surfactants such as fatty acids, amines, amides and organic sulphonates and mixtures thereof. Drilling fluid may be prepared by admixing from about 10 to about 70 ppb (parts per barrel herein) of ammonium chloride with an aqueous fluid until a substantial portion of the ammonium chloride dissolves. The aqueous fluid can comprise fresh water, formation water, brine or the like. Preferably, the aqueous fluid comprises fresh water; however fresh water is not always available in sufficient quantities. A quantity of from about 65 to about 150 ppb of sodium chloride then is admixed with the aqueous fluid. The quantity of sodium chloride necessary to saturate the fluid at the existing aqueous fluid temperature dissolves and the remainder remains suspended in the fluid. The undissolved remainder will provide salt necessary to saturate the aqueous fluid at higher temperature levels which may occur during use of the aqueous fluid in drilling operations. In instances in which the aqueous fluid comprises a brine, lesser quantities of sodium chloride will be required to provide a total concentration in the designated range.

Upon dissolution of a substantial portion of the salts, a viscosifying agent comprising prehydrated bentonite, attapulgite, sepiolite or the like is optionally admixed with the aqueous solution. Sufficient viscosifying agent is admixed with the aqueous solution to provide a concentration of from about 5 to about 30 ppb of the drilling fluid. While the viscosifying agent provides some fluid-loss control, it is desirable to admix a selected fluid-loss control agent with the fluid to enhance the rheological properties of the fluid. The fluid-loss control agent comprises a resin of the invention alone or in combination with another polymer such as, for example, PVOH homopolymer resin or a cellulose derivative such as carboxymethylcellulose, a starch, a vinylamide/vinylsulfonate polymer or the like as well as suitable mixtures thereof.

The fluid-loss control agent of the invention is generally admixed with the fluid in an amount in the range of from about zero to about 20 ppb. The fluid also can be admixed with a quantity of diesel oil or the like to form an emulsion which also functions to reduce fluid loss. If a quantity of a hydrocarbon is admixed with the aqueous drilling fluid, the hydrocarbon can be present in an amount of from about 0 to about 30 percent of the total fluid volume.

Preferably, a pH control and rheology stabilizing agent is admixed with the drilling fluid, however, such agent is not required by the composition of the present invention. One preferred pH-control and rheology-control agent is ferrous gluconate. The ferrous gluconate buffers the pH of the fluid against rapid pH change over a wide pH range and stabilizes the fluid by reducing the possibility of free ammonia generation as a result of pH excursions. The ferrous gluconate also provides some corrosion protection to the well bore tubular goods by complexing any hydrogen sulfide present in the drilling fluid. The ferrous gluconate generally is admixed with the fluid in an amount of from about zero to about 10 ppb.

The pH of the drilling fluid is adjusted to provide a pH in the range of from about 5.0 to 9.0 and, preferably, from about 7.0 to 9.0. The pH adjustment normally is accomplished by the addition of an alkaline agent such as sodium hydroxide or the like. The presence of ferrous gluconate in the drilling fluid effectively neutralizes any increased potential for corrosion which results from the slightly acid pH range of the fluid. At a pH in excess of 9.5, free ammonia gas can be liberated from the drilling fluid. This is undesirable because it will result in a substantial change in the rheological properties of the drilling fluid and is potentially hazardous to any personnel exposed to the gas.

A corrosion agent also can be admixed with the drilling fluid to provide additional corrosion protection. The corrosion agent can comprise a quaternary amine salt such as, for example, an alkylbenzyl pyridine quat, alkylpolyoxy-ethyl-enebenzylammonium chloride, imidazoline complexes with fatty acids, or like compounds which are well known to individuals skilled in the art.

A weighting agent then is admixed with the drilling fluid in an amount sufficient to produce a fluid having a weight in the range of from about 8.5 to about 18 pounds per gallon. The weighting agent can comprise barite, iron oxide such as hematite, galena, siderite, or any other material which is capable of weighting a drilling fluid.

Drilling fluids of the invention were prepared and tested as set forth in the following tables. Fluid loss was tested at room temperature (API Specification 10) and at high pressure, high temperature. Plastic Viscosity was tested before and after hot rolling with shale in a jar. Results indicated the dispersions of the invention were stable to shale; that is, hot rolling did not cause a large viscosity increase which indicates instability. Composition 1, containing no copolymer, exhibited viscosity increases at 100 to 600 rpm after hot rolling.

Results are summarized in Table 19; details appear in Tables 20 and 21.

TABLE 19

Summary of Drilling Fluid Results

|  | Fresh water | | |
|---|---|---|---|
| VOH/AMPS Copolymer level, % of solids | 0 | 1 | 4 |
| Plastic Viscosity (initial)*, cps | 7 | 15 | 18 |
| Plastic Viscosity (after hot rolling for 16 hrs at 150° F.)*, cps | 7 | 9 | 12 |
| Viscosity Increase, cps | slight | none | none |
| Settling | light | none | light |
| API Filtrate, mL/30 min | 13.4 | 10.1 | 3.8 |
| HPHT Filtrate**, mL/30 min | 34.4 | 28.0 | 26.6 |
|  | Salt water | | |
| VOH/AMPS Copolymer level, % of solids | 0 | 1 | 4 |
| Plastic Viscosity (initial)*, cps | 10 | 10 | 11 |
| Plastic Viscosity (after hot rolling for 16 hrs at 150° F.)*, cps | 6 | 8 | 6 |
| Viscosity Increase, cps | none | none | none |
| Settling | none | none | none |
| API Filtrate, mL/30 min | 22.4 | 31.8 | 31.3 |
| HPHT Filtrate**, mL/30 min | 90.4 | 58.4 | 68.4 |

*Viscosity tests conducted at 120° F.
**High pressure high temperature fluid loss tests conducted at 300° F.

TABLE 20

Drilling Compositions

| | Composition Number | | | | | | |
|---|---|---|---|---|---|---|---|
| Composition Description | 1 | 2 | 3 | 4 | 5 | 6 | 7 |
| Fresh water, mL | 320 | 320 | 320 | 320 | 320 | 320 | 320 |
| NewGel NT, g | 10.0 | 10.0 | 10.0 | 10.0 | 10.0 | 10.0 | 10.0 |
| NewEdge, g | 5.0 | 5.0 | 5.0 | 5.0 | 5.0 | 5.0 | 5.0 |
| Caustic Soda, g | 2.0 | 2.0 | 2.0 | 2.0 | 2.0 | 2.0 | 2.0 |
| XC polymer, g | 0.50 | 0.50 | 0.50 | 0.50 | 0.50 | 0.50 | 0.50 |
| Barite, g | 81.2 | 81.2 | 81.2 | 81.2 | 81.2 | 81.2 | 81.2 |
| VOH/AMPS Copolymer | 0 | 1.0 | 1.0 | 1.0 | 4.0 | 4.0 | 4.0 |

TABLE 21

Rheology

Rheology (Before Hot Rolling)

| | Composition | | | | | | | | | | | | | |
|---|---|---|---|---|---|---|---|---|---|---|---|---|---|---|
| | 1 | | 2 | | 3 | | 4 | | 5 | | 6 | | 7 | |
| | 80° F. | 120° F. | 80° F. | 120° F. | 80° F. | 120° F. | 80° F. | 120° F. | 80° F. | 120° F. | 80° F. | 120° F. | 80° F. | 120° F. |
| 600 rpm | 28 | 19 | 37 | 42 | 39 | 36 | 46 | 42 | 38 | 45 | 46 | 42 | 58 | 48 |
| 300 rpm | 18 | 12 | 25 | 28 | 26 | 24 | 31 | 27 | 25 | 34 | 30 | 27 | 38 | 30 |
| 200 rpm | 14 | 10 | 18 | 20 | 19 | 17 | 24 | 22 | 19 | 30 | 22 | 21 | 28 | 23 |
| 100 rpm | 9 | 6 | 13 | 14 | 13 | 12 | 17 | 15 | 13 | 26 | 14 | 13 | 18 | 15 |
| 6 rpm | 3 | 3 | 5 | 5 | 5 | 4 | 6 | 5 | 4 | 13 | 4 | 4 | 6 | 5 |
| 3 rpm | 2 | 2 | 3 | 3 | 3 | 3 | 5 | 3 | 3 | 12 | 3 | 3 | 4 | 3 |
| Plastic viscosity, cps | 10 | 7 | 12 | 14 | 13 | 12 | 15 | 15 | 13 | 11 | 16 | 15 | 20 | 18 |
| Yield point, lb/100 ft$^2$ | 8 | 5 | 13 | 14 | 13 | 12 | 16 | 12 | 12 | 23 | 14 | 12 | 18 | 12 |
| Initial gel, lb/100 ft$^2$ | 3 | 3 | 5 | 5 | 5 | 4 | 7 | 5 | 3 | 6 | 4 | 4 | 6 | 4 |

TABLE 21-continued

| Rheology | | | | | | | | | | | | | | |
|---|---|---|---|---|---|---|---|---|---|---|---|---|---|---|
| 10 minute gel, lb/100 ft² | 8 | 7 | 12 | 10 | 12 | 10 | 15 | 12 | 18 | 42 | 19 | 13 | 14 | 12 |
| pH | 11.87 | | 11.78 | | 11.77 | | 11.75 | | 11.7 | | 11.7 | | 11.7 | |

Rheology (After Hot Rolling for 16 hrs @150° F.)

| | Composition | | | | | | | | | | | | | |
|---|---|---|---|---|---|---|---|---|---|---|---|---|---|---|
| | 1 | | 2 | | 3 | | 4 | | 5 | | 6 | | 7 | |
| | 80° F. | 120° F. | 80° F. | 120° F. | 80° F. | 120° F. | 80° F. | 120° F. | 80° F. | 120° F. | 80° F. | 120° F. | 80° F. | 120° F. |
| 600 rpm | 25 | 22 | 33 | 30 | 29 | 26 | 29 | 26 | 36 | 32 | 37 | 31 | 34 | 32 |
| 300 rpm | 18 | 15 | 22 | 19 | 19 | 17 | 19 | 17 | 24 | 21 | 24 | 20 | 22 | 20 |
| 200 rpm | 12 | 11 | 16 | 14 | 15 | 13 | 14 | 13 | 17 | 15 | 17 | 15 | 16 | 14 |
| 100 rpm | 9 | 8 | 11 | 10 | 10 | 9 | 10 | 9 | 11 | 10 | 11 | 10 | 11 | 10 |
| 6 rpm | 3 | 3 | 3 | 3 | 3 | 3 | 3 | 3 | 4 | 3 | 4 | 3 | 3 | 3 |
| 3 rpm | 2 | 2 | 2 | 2 | 2 | 2 | 2 | 2 | 3 | 2 | 3 | 2 | 2 | 2 |
| Plastic viscosity, cps | 7 | 7 | 11 | 11 | 10 | 9 | 10 | 9 | 12 | 11 | 13 | 11 | 12 | 12 |
| Yield point, lb/100 ft² | 11 | 8 | 11 | 8 | 9 | 8 | 9 | 8 | 12 | 10 | 11 | 9 | 10 | 8 |
| Initial gel, lb/100 ft² | 3 | 2 | 4 | 3 | 3 | 3 | 3 | 3 | 4 | 3 | 4 | 3 | 3 | 2 |
| 10 minute gel, lb/100 ft² | 6 | 5 | 11 | 9 | 8 | 9 | 8 | 9 | 9 | 7 | 9 | 6 | 6 | 4 |
| API filtrate, mL/30 min | 13.4 | | 10.6 | | 9 6 | | 10.1 | | 4.2 | | 3 8 | | 3 8 | |
| API filter cake, 1/32$^{nd}$ in | 2 | | 2 | | 2 | | 2 | | 1 | | 1 | | 1 | |

Rheology (After Hot Rolling for 16 hrs @150° F.)

| | Composition | | | | | | |
|---|---|---|---|---|---|---|---|
| | 1 | 2 | 3 | 4 | 5 | 6 | 7 |
| HTHP filtrate @ 300° F., mL/30 min | 34.4 | 28.0 | 27.4 | 28.0 | 26.8 | 26.2 | 26.6 |
| HTHP filter cake, 1/32$^{nd}$ in | 5 | 4 | 4 | 4 | 4 | 4 | 4 |
| pH | 10.98 | 10.92 | 10.93 | 10.95 | 10.9 | 10.9 | 10.9 |
| Mud alkalinity, ml | 3.2 | 3.1 | 3.1 | 3.2 | 3.10 | 3.10 | 3.20 |
| Filtrate alkalinities-Pf/Mf, ml | 2.40  3.10 | 2.30  4.20 | 2.30  4.20 | 2.40  4.00 | 2.30  4.20 | 2.30  4.30 | 2.40  4.40 |
| Chlorides, mg/L | 600 | 600 | 600 | 600 | 600 | 600 | 600 |
| Total Hardness, mg/L | 60 | 60 | 60 | 60 | 80 | 80 | 80 |
| Settling | Light | None | None | None | None | Light | Light |

This data shows that the addition of copolymer did not adversely affect the plastic viscosity of the drilling mud either before or after hot rolling. Seeing no viscosity increase after hot rolling in combination with little to no additional settling as compared to the unmodified mud indicates that the additive performs well as a shale stabilizer. Finally, the numbers for API and HTHP filtrate indicate that the copolymer does not adversely affect fluid loss performance and in fact reduces fluid loss.

Hydraulic Cement

The resins of the invention are also particularly effective fluid loss additives for hydraulic cement compositions, for example, for use in petroleum well applications. Petroleum well cementing involves mixing a slurry of cement, water, and other additives and pumping it down through steel casing to critical points in the oil well annulus around the casing or in the open hole below the casing string. The primary functions of the cementing process are to restrict fluid movement between geological formations and to bond and support the casing. In addition, the cement aids in protecting the casing from corrosion, preventing blowouts by quickly sealing formations, protecting the casing from shock loads in drilling deeper wells, and sealing off lost circulation or thief zones. A common problem in petroleum well cementing is the flow of liquid from the cement slurry into porous earth formations in contact with the cement. This fluid loss is undesirable since it can result in dehydration of the cement slurry, and it causes thick filter cakes of cement solids which can plug the well bore. The fluid lost can damage sensitive formations. Cement fluid loss is particularly a problem in the process known as squeeze cementing. There is a requirement, therefore, for materials which, when added to the cement formulation, reduce the loss of fluid from the slurry to porous formations. Polyvinyl alcohol resins are used for this purpose in hydraulic cement compositions. See U.S. Pat. No. 6,180,689 of Moulin; U.S. Pat. No. 5,728,210 entitled "Composition and Method to Control Cement Slurry Loss and Viscosity" of Moran et al. and U.S. Pat. No. 5,850,880 entitled "Composition and Method to Control Cement Slurry Loss and Viscosity" of Moran et al. The polyvinyl alcohol resins of the present invention exhibit surprising effectiveness as a hydraulic cement fluid loss additive, at much lower viscosity than conventional polyvinyl alcohol resins as will be appreciated from the data which follows. In the tables, "By weight of cement" (bwoc) refers to a weight of an additive in dry form as added to the cement composition based on the cement solids only. "API fluid loss" is measured in accordance with American Petroleum Institute Specification 10, July 1990 and is expressed in ml/30 min unless otherwise indicated. "Characteristic viscosity" or viscosity of a resin is measured in 4% w/w aqueous solution at 20° C.

Figure 8:
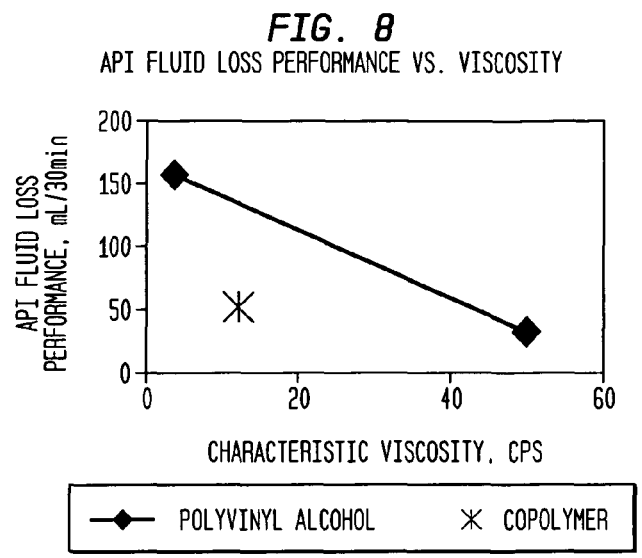
FIG. 8 is a plot of Fluid Loss vs. Viscosity for cement compositions incorporating conventional VOH resins and the VOH/AMPS copolymer of the invention.

Cement, compositions were conventionally prepared and tested for fluid loss. Results appear in FIG. 8 and in Table 22 below. Table 23 provides details on the compositions. DAXAD® refers to a dispersant; GCR refers to a commercially available defoamer.

This data shows that the copolymer preferentially affects fluid loss performance, as it does not follow conventional linear behavior versus viscosity. The inventive VOH/AMPS Copolymer shows unexpectedly effective reduction of fluid loss in cement. In the oil field cementing industry, API Fluid Loss performance of less than 100 mL/30 minutes is considered good. API Fluid Loss performance of less than 50 mL/30 min is considered very good. Therefore, Celvol 540S is a standard in the industry. The copolymer demonstrated API Fluid Loss performance near 50 mL/30 min, indicating its potential for use in this application.

TABLE 22

Fluid Loss Comparison

| | Fluid Loss Control Additive | | |
|---|---|---|---|
| | Celvol 203S | Celvol 540S*** | PVOH/AMPS Copolymer |
| Characteristic Viscosity (average), cps | 4 | 50 | 12 |
| Ratio of Dispersant to Fluid Loss Control Additive | 2:1 | 2:1 | 2:1 |
| Test Temperature, °F.* | 190 | 190 | 180 |
| API Fluid Loss | 157** | 32 | 52** |

*A 10° F. difference in test temperature is negligible
**Calculated API Fluid Loss
***Celvol 540S was used at half the concentration of the others

TABLE 23

Cement Compositions

| Component | Units | Type | Conc. | Specific Gravity | Grams |
|---|---|---|---|---|---|
| Cement | #/sk | Lehigh Class H | 94.00 | 3.140 | 851.80 |
| Poz | | | | | 0.00 |
| | % bwoc | DAXAD 19 | 2.00 | 1.430 | 17.04 |
| | % bwoc | VOH/AMPS Copolymer PVA (R-88) | 1.00 | 0.600 | 8.52 |
| | % bwoc | GRC-4 | 0.20 | 1.510 | 1.70 |
| Water | Gal/sk | fresh | 4.00 | 1.000 | 302.21 |
| | % bwow | | | | 0.00 |
| Cement | #/sk | Lehigh Class H | 94.00 | 3.140 | 851.80 |
| Poz | | | | | 0.00 |
| | % bwoc | DAXAD 19 | 2.00 | 1.430 | 17.04 |
| | % bwoc | 203-S PVA (R-65) | 1.00 | 0.600 | 8.52 |
| | % bwoc | GRC-4 | 0.20 | 1.510 | 1.70 |
| Water | Gal/sk | fresh | 4.00 | 1.000 | 302.21 |
| | % bwow | | | | 0.00 |
| Cement | #/sk | Lehigh Class H | 94.00 | 3.140 | 851.40 |
| Poz | | | | | 0.00 |
| | % bwoc | DAXAD 19 | 1.00 | 1.430 | 8.51 |
| | % bwoc | Celvol 540-s | 0.50 | 0.600 | 4.26 |
| | % bwoc | GRC-4 | 0.20 | 1.510 | 1.70 |
| Water | Gal/sk | fresh | 4.18 | 1.000 | 315.40 |
| | % bwow | | | | 0.00 |

The inventive resins are thus useful in a broad range of hydraulic cement compositions to control fluid loss. Included in such compositions may be ground granulated blast-furnace slag, natural cement, portland cement, modified portland cement, masonry cement, hydraulic hydrated lime, and combinations of these and other materials. By portland cement is meant a hydraulic cement produced by pulverizing clinker, comprising hydraulic calcium silicates, calcium aluminates, and calcium aluminoferrites, and usually containing one or more of the forms of calcium sulfate as an interground addition, and includes, of course portland cement, the specification for which is set forth in ASTM specification C 150, and cements that are chemically similar or analogous to portland cement, the specifications for which are set forth in ASTM specifications C 1157, C 595, and C 845. The cement composition described herein may contain other additives or ingredients and should not be limited to the stated formulations. In addition to fluid loss additives, cement additives that can be added include, but are not limited to: set accelerators, set retarders, air-entraining agents, defoamers, corrosion inhibitors, strength enhancing agents, fibers, dampproofing admixtures, expansive agents, permeability reducers, pumping aids, fungicidal admixtures, germicidal admixtures, insecticidal admixtures, shrinkage reducing admixtures, aggregates, pozzolans, viscosifying agents, weighting agents and any other admixture or additive that does not adversely affect the properties of the admixture. Further details may be found in U.S. patent application Ser. No. 10/626,971, Publication No. 2004-0127606, now U.S. Pat. No. 7,044,170.

The resins of the invention can be used alone as fluid loss additives or combined with conventional polyvinyl alcohol resins as part of a polymeric fluid loss additive package which may further include cellulose derivatives and acrylamide copolymers. Suitable polymers are enumerated in U.S. Pat. No. 4,557,763 and U.S. Pat. No. 4,626,285. Preferred cellulose derivatives include hydroxyethyl cellulose ("HEC") and carboxymethylhydroxy-ethyl cellulose ("CMHEC"). Another class of polymers useful in connection with the present invention are acrylamide copolymers with, for example, acrylic acid. One suitable class is hydrolyzed copolymers of acrylic acid and 2-acrylamido, 2-methyl propane sulfonic acid ("AMPS/AA" copolymer additive). Still another example of a preferred second fluid loss additive is copolymers of N,N-dimethylacrylamide and 2-acrylamido, 2-methyl propane sulfonic acid ("NNDMA/AMPS" copolymer additive). Preferably, the cellulose derivative use is controlled so as not to retard setting more than is desired.

A dispersant if used in the aqueous cement dispersion can be any suitable dispersant such as calcium lignosulfonates, beta naphthalene sulfonates, sulfonated melamine formaldehyde condensates, polyaspartates, or sodium naphthalene sulfate formaldehyde condensate resins, for example, LOMAR® D. (Cognis Inc., Cincinnati, Ohio). Additionally, polycarboxylate dispersants can be used, by which is meant a dispersant having a carbon backbone with pendant side chains, wherein at least a portion of the side chains are attached to the backbone through a carboxyl group or an ether group. The term dispersant is also meant to include those chemicals that also function as a plasticizer, high range water reducer, fluidizer, antiflocculating agent, or superplasticizer for cement compositions. Examples of polycarboxylate dispersants can be found in U.S. Pat. Nos. 6,267,814; 6,290,770; 6,310,143; 6,187,841; 5,158,996; 6,008,275; 6,136,950; 6,284,867; 5,609,681; 5,494,516; 5,674,929; 5,660,626; 5,668,195; 5,661,206; 5,358,566; 5,162,402; 5,798,425; 5,612,396; 6,063,184; 5,912,284; 5,840,114; 5,753,744; 5,728,207; 5,725,657; 5,703,174; 5,665,158; 5,643,978; 5,633,298; 5,583,183; and 5,393,343, which are incorporated herein by reference.

The resins of the invention are used in other mineral containing dispersions such as clay coatings, discussed below.

Mineral Containing Aqueous Dispersions and Color Coat Compositions

The polyvinyl alcohol resins provided with a sulfonic acid functionality in accordance with the invention may be used as a slip additive and co-binder in aqueous pigment coating compositions. The inventive resins are operative to reduce slurry viscosity and have the advantages that they are highly soluble (little if any cooking required) and boost brightener performance. Suitably, a composition includes (parts by wt): 100 parts pigment containing clay and/or calcium carbonate and 0 to 35 parts secondary pigment such as titanium dioxide; 0.01 to 0.5 parts dispersing or stabilizing agent; 1 to 30 parts latex polymer binder emulsion (solids basis); 0.1 to 10 parts, preferably 0.5 to 2 parts, polyvinyl alcohol (sulfonated PVOH or sulfonated PVOH mixed with PVOH homopolymer) co-binder; 0.1 to 20 parts other co-binders; 0 to 0.2 parts defoamer, and sufficient water to provide the desired level of solids, usually about 45 to 70 wt. %, preferably 60 to 70 wt. % or more for high solids paper coating compositions. Suitable optical brighteners optionally included are of the stilbene class such as are disclosed in U.S. Pat. No. 6,620,294 and U.S. Pat. No. 5,830,241. Commercially available optical brighteners include UVITEX® and TINOPAL® from Ciba Specialty Chemicals, BLANKOPHOR® from Bayer and HOSTALUX®, LEUCOPHOR® from Clariant and PARAWHITE® from Paramount. In some preferred embodiments, the optical brightener active ingredient comprises a stilbene compound and may be a sulfonated stilbene compound, such as a tetrasulfonated stilbene compound or a hexasulfonated stilbene compound. One preferred class is wherein the optical brightener active ingredient comprises a stilbene compound of the formula:

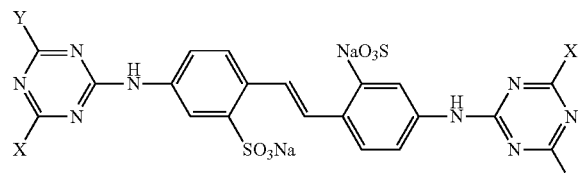

wherein X and Y are independently selected from the moieties indicated below:

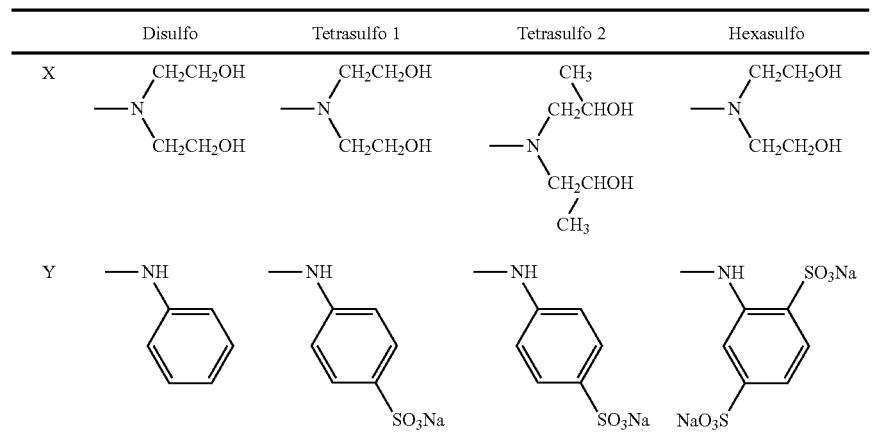

Color coat formulations are formulated by conventional techniques and are sometimes expressed in both dry parts and wet parts per 100 parts dry pigment. A typical or "standard" coating formulation is as follows:

100 parts dry pigment@70% solids=142.9 wet parts
14 dry parts latex@50% solids=28 wet parts
0.34 dry parts@17% OB
Active Ingredient=2 wet parts
1 dry part PVOH @ 25% solids=4 wet parts The coating compositions produced may be applied to fibrous paper webs using any of the conventional coating devices, including trailing blade coaters, air-knife coaters, roll coaters, and the like. Further detail may be found in U.S. Pat. No. 5,057,570 to Air Products and Chemicals, Oct. 15, 1991, which describes a process for producing paper coating compositions using partially hydrolyzed, low molecular weight polyvinyl alcohol. The advantage of using this polymer is that no external heating is required and that it can be added as a dry solid to the aqueous pigment dispersion. This can be accomplished under high shear stirring, typically at speeds of 1500 rpm for 5 minutes at room temperature. See also U.S. Pat. No. 6,620,294.

Figure 9:
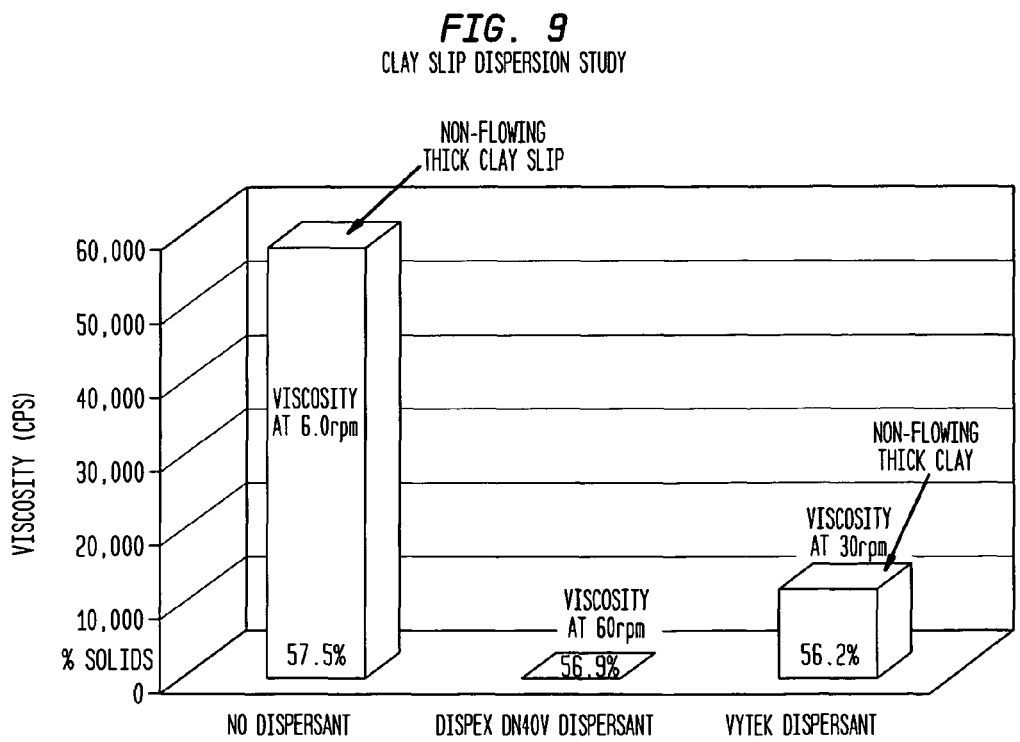
FIG. 9 is a histogram illustrating the usefulness of the VOH/AMPS copolymer of the invention as a slip agent for concentrated clay dispersions.

It is seen in the following that the inventive resins reduce clay slurry viscosity for processability. To this end, a series of 55-60% solids clay slurries were prepared and tested as described in Table 24. Results are presented graphically in FIG. 9.

TABLE 24

Clay Slip Dispersion Study
Formulation

| Dry | | Wet |
|---|---|---|
| 1) Clay Slip without Dispersant | | |
| 329.7 | RP-2 Clay | 568.4 |
| 2) Clay Slip with Dispex ® DN40V (dispersant): | | |
| 600 | RP-2 Clay | 1047.1 |
| 3 | DN40V | 7.5 |
| 3) Clay Slip with VOH/AMPS Copolymer: | | |
| 600 | RP-2 Clay | 1011.8 |
| 3 | VOH/AMPS Copolymer | 30 |

| Formulation | % Solids | Viscosity (cps) | Comments |
|---|---|---|---|
| Clay slip no Dispersant | 57.5 | 58,000 | Visc. @ 6.0 rpm, RT sp #4, non-flowing thick clay slip. |
| Clay Slip W/DN40V | 56.9 | 138 | Visc. @ 60 rpm sp #2, very fluid clay slip. |
| Clay Slip w/VOH/AMPS Copolymer | 56.2 | 11,957 | Visc. @ 30 rpm, RT sp #4, non-flowing thick clay slip. |

It is seen from the data that the PVOH/AMPS resins of the invention are effective slip agents. Thus, the PVOH/AMPS resins can be used as slip agent and brightener booster, performing both functions and reducing the need for multiple additives.

The resins of the invention can also be added at the wet end of a papermaking machine as noted below.

Aqueous Papermaking Furnishes

Aqueous papermaking furnishes used to make paper generally include cellulosic fiber (chemical or mechanical pulp) dispersed in water at low loading and chemical additives. The furnish is processed into either fine papers or absorbent sheet such as tissue or towel. See U.S. Pat. No. 6,752,907 to Edwards et al. for a summary of some of the various processes. The chemical additives to the furnish frequently alter the physical properties of the paper produced and may be included as processing aids. Such chemistries are well understood by the skilled artisan and may include surface modifiers, softeners, debonders, strength aids, latexes, opacifiers, optical brighteners, dyes, pigments, sizing agents, barrier chemicals, retention aids, insolubilizers, organic or inorganic crosslinkers, or combinations thereof, optionally comprising polyols, starches, PPG esters, PEG esters, phospholipids, surfactants, polyamines, HMCP or the like.

The pulp can be mixed with strength adjusting agents such as wet strength agents, dry strength agents and debonders/softeners and so forth. A comprehensive but non-exhaustive list of useful strength aids include urea-formaldehyde resins, melamine formaldehyde resins, glyoxylated polyacrylamide resins, polyamide-epichlorohydrin resins and the like. Thermosetting polyacrylamides are produced by reacting acrylamide with diallyl dimethyl ammonium chloride (DADMAC) to produce a cationic polyacrylamide copolymer which is ultimately reacted with glyoxal to produce a cationic cross-linking wet strength resin, glyoxylated polyacrylamide. These materials are generally described in U.S. Pat. Nos. 3,556,932 to Coscia et al. and 3,556,933 to Williams et al., both of which are incorporated herein by reference in their entirety. Resins of this type are commercially available under the trade name of PAREZ® 631NC by Bayer Corporation. Different mole ratios of acrylamide/-DADMAC/glyoxal can be used to produce cross-linking resins, which are useful as wet strength agents. Furthermore, other dialdehydes can be substituted for glyoxal to produce thermosetting wet strength characteristics. Of particular utility are the polyamide-epichlorohydrin wet strength resins, an example of which is sold under the trade names Kymene® 557LX and Kymene® 557H by Hercules Incorporated of Wilmington, Del. and Amres® from Georgia-Pacific Resins, Inc. These resins and the process for making the resins are described in U.S. Pat. No. 3,700,623 and U.S. Pat. No. 3,772,076 each of which is incorporated herein by reference in its entirety. An extensive description of polymeric-epihalohydrin resins is given in Chapter 2: Alkaline-Curing Polymeric Amine-Epichlorohydrin by Espy in Wet Strength Resins and Their Application (L. Chan, Editor, 1994), herein incorporated by reference in its entirety. A reasonably comprehensive list of wet strength resins is described by Westfelt in Cellulose Chemistry and Technology Volume 13, p. 813, 1979, which is incorporated herein by reference.

Suitable temporary wet strength agents may likewise be included. A comprehensive but non-exhaustive list of useful temporary wet strength agents includes aliphatic and aromatic aldehydes including glyoxal, malonic dialdehyde, succinic dialdehyde, glutaraldehyde and dialdehyde starches, as well as substituted or reacted starches, disaccharides, polysaccharides, chitosan, or other reacted polymeric reaction products of monomers or polymers having aldehyde groups, and optionally, nitrogen groups. Representative nitrogen containing polymers, which can suitably be reacted with the aldehyde containing monomers or polymers, include vinyl-amides, acrylamides and related nitrogen containing polymers. These polymers impart a positive charge to the aldehyde containing reaction product. In addition, other commercially available temporary wet strength agents, such as, PAREZ 745, manufactured by Cytec® can be used, along with those disclosed, for example in U.S. Pat. No. 4,605,702.

The temporary wet strength resin may be any one of a variety of water-soluble organic polymers comprising aldehydic units and cationic units used to increase dry and wet tensile strength of a paper product. Such resins are described in U.S. Pat. Nos. 4,675,394; 5,240,562; 5,138,002; 5,085,736; 4,981,557; 5,008,344; 4,603,176; 4,983,748; 4,866,151; 4,804,769 and 5,217,576. Modified starches sold under the trademarks CO-BOND® 1000 and CO-BOND® 1000 Plus, by National Starch and Chemical Company of Bridgewater, N.J. may be used. Prior to use, the cationic aldehydic water soluble polymer can be prepared by preheating an aqueous slurry of approximately 5% solids maintained at a temperature of approximately 240° Fahrenheit and a pH of about 2.7 for approximately 3.5 minutes. Finally, the slurry can be quenched and diluted by adding water to produce a mixture of approximately 1.0% solids at less than about 130° Fahrenheit.

Other temporary wet strength agents, also available from National Starch and Chemical Company are sold under the trademarks CO-BOND® 1600 and CO-BOND® 2300. These starches are supplied as aqueous colloidal dispersions and do not require preheating prior to use.

Suitable dry strength agents include starch, guar gum, polyacrylamides, carboxymethyl cellulose and the like. Of particular utility is carboxymethyl cellulose, an example of which is sold under the trade name Hercules CMC, by Hercules Incorporated of Wilmington, Del. According to one embodiment, the pulp may contain from about 0 to about 15 lb/ton of dry strength agent. According to another embodiment, the pulp may contain from about 1 to about 5 lbs/ton of dry strength agent.

Debonders or softeners may also be incorporated into the pulp or sprayed upon the web after its formation. Such materials are disclosed in U.S. Pat. No. 4,720,383. Evans, Chemistry and Industry, 5 Jul. 1969, pp. 893-903; Egan, J. Am. Oil Chemist's Soc., Vol. 55 (1978), pp. 118-121; and Trivedi et al., J. Am. Oil Chemist's Soc., June 1981, pp. 754-756, each incorporated by reference in its entirety, indicate that softeners are often available commercially only as complex mixtures rather than as single compounds. Biodegradable softeners can be utilized. Representative biodegradable cationic softeners/debonders are disclosed in U.S. Pat. Nos. 5,312,522; 5,415,737; 5,262,007; 5,264,082; and 5,223,096, all of which are incorporated herein by reference in their entirety. The compounds are biodegradable diesters of quaternary ammonia compounds, quaternized amine-esters, and biodegradable vegetable oil based esters functionalized with quaternary ammonium chloride and diester dierucyldimethyl ammonium chloride and are representative biodegradable softeners.

The polyvinyl alcohol resins of the present invention can be added to papermaking furnish at the wet end of a papermachine as a strength agent, dispersant, other processing aid and so forth, either alone or in combination with any of the agents noted above and have the advantage of being repulpable; a highly desirable feature for recycling.

Melt Extrusion

The copolymers of PVOH and a sulfonic acid containing comonomer of this invention (sometimes referred to herein as co-AMPS) are particularly suitable for the melt extrusion of water-soluble or water-swellable films. However, to aid in the melt extrusion of these films, it is sometimes advantageous to add a plasticizer to the melt prior to extrusion. Such plasticizers may be, for example, ethylene glycol (PEG), trimethylene glycol, propylene glycol, 2,2,4-trimethyl-1,3-pentanediol, glycerol, mannitol, pentaerythritol or glycerine.

Another expedient for the smooth melt extrusion of the copolymer is a water-aided extrusion which lowers the melting point somewhat and enables the extrusion of a more uniform melt at a relatively low temperature. This technique involves the formation of a high solids solution of the copolymer which is then extruded into a film from which the moisture is removed through evaporation to form a solid water-free sheet.

To vary the properties of the extruded film, a small amount of one or more additional comonomers, e.g., methyl methacrylate or an olefin such as ethylene or propylene, may be copolymerized with the vinyl acetate and sulfonic acid containing monomer. Such amount may be, for example, about 1 to 10 mole % based on the moles of total comonomers.

In addition to plasticizer, other materials such as a dispersing agent or an acid such as phosphoric acid which neutralizes any sodium acetate forming from the hydrolysis of the acetate in the polymerized vinyl acetate units to form the polymerized vinyl alcohol units in the desired copolymer, may be added to the copolymer melt prior to extrusion.

The extruder used in the melt compounding of the copolymer must be sufficient to provide a melt of desirable properties but not much beyond that necessary to obtain such a melt. Thus, any excess energy provided by the extruder is "waste" energy which must be removed by the extruder to avoid degeneration of the melt. Various extruders are commercially available for this purpose such as Buss Condux kneaders and the Werner and Pfleiderer twin screw extruder.

The water soluble films produced by melt extruding the copolymers are useful for any purpose wherein water-solubility is an advantage. The films are particularly suitable for unit-dose packaging of agricultural chemicals, microbiocides and the like, under airtight packaging conditions, where the chemicals in packaged form are thrown into water so that the contents are dissolved or dispersed in the water. This is accomplished without the necessity of the user directly touching harmful chemicals, with the measurement of the chemicals for use being unnecessary since the unit dose is already packaged. Suitable extrusion techniques are further enumerated in U.S. Pat. Nos. 5,137,969 and 5,051,222, both to Marten et al.

In order to demonstrate melt extrudability, a series of formulations were prepared utilizing polyethylene glycol as a plasticizer. Particular formulations were melt blended and tested for melt viscosity as a function of shear rate in a capillary viscometer.

Figure 10:
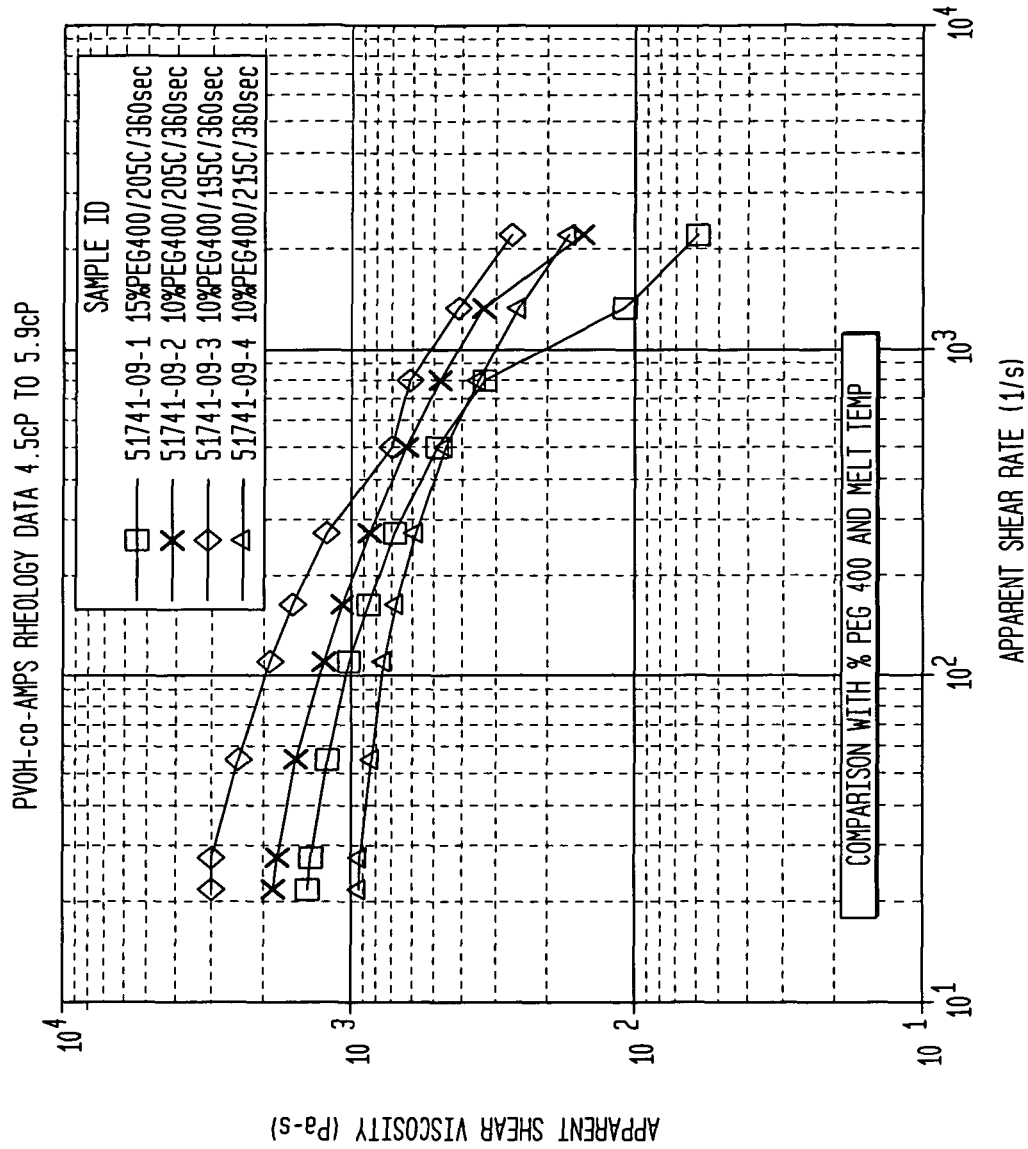
FIGS. 10-12 are plots of Melt Viscosity vs. Shear for various compositions of the invention including VOH/AMPS copolymer and a polyethylene glygol (PEG) plasticizer.
Figure 11:
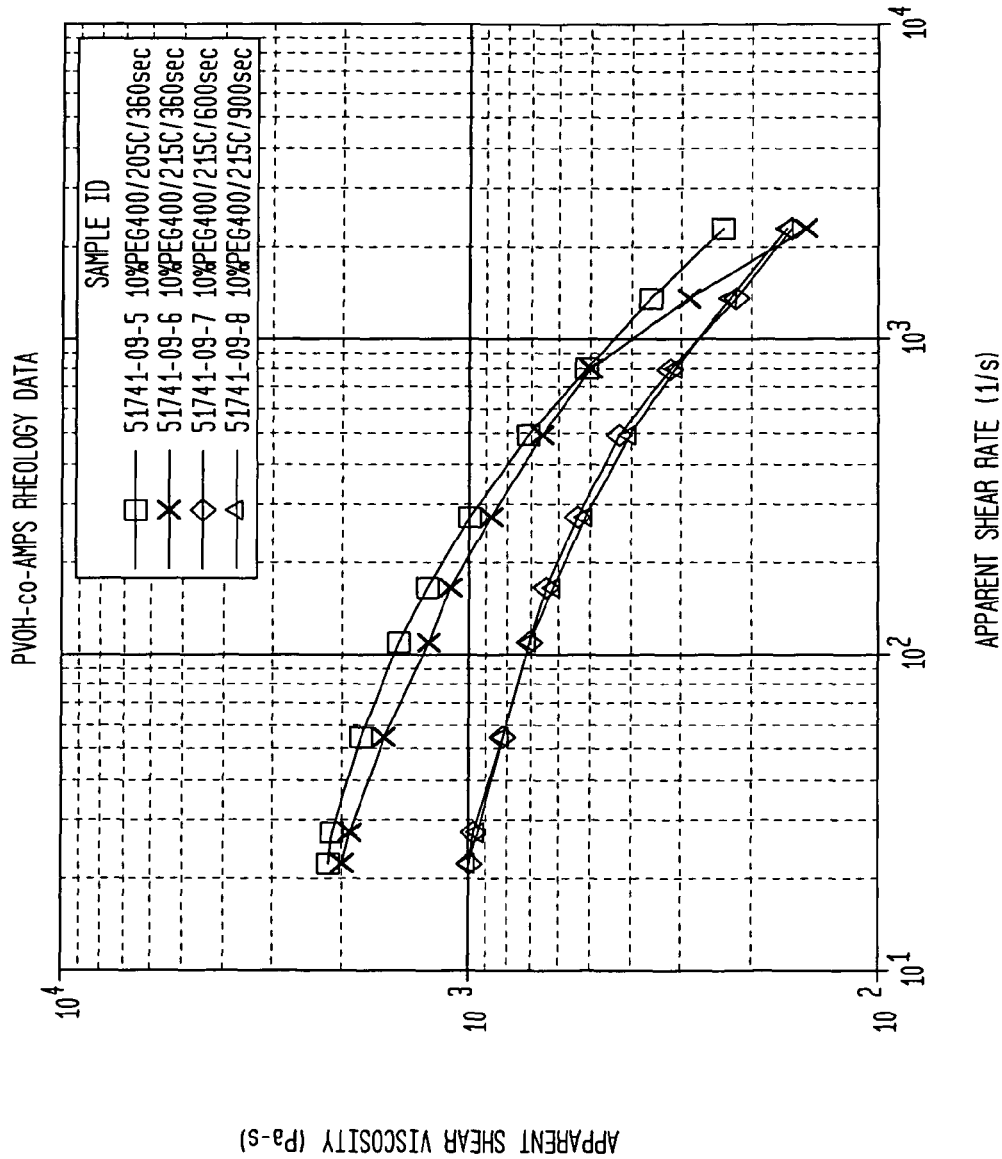
Figure 12:
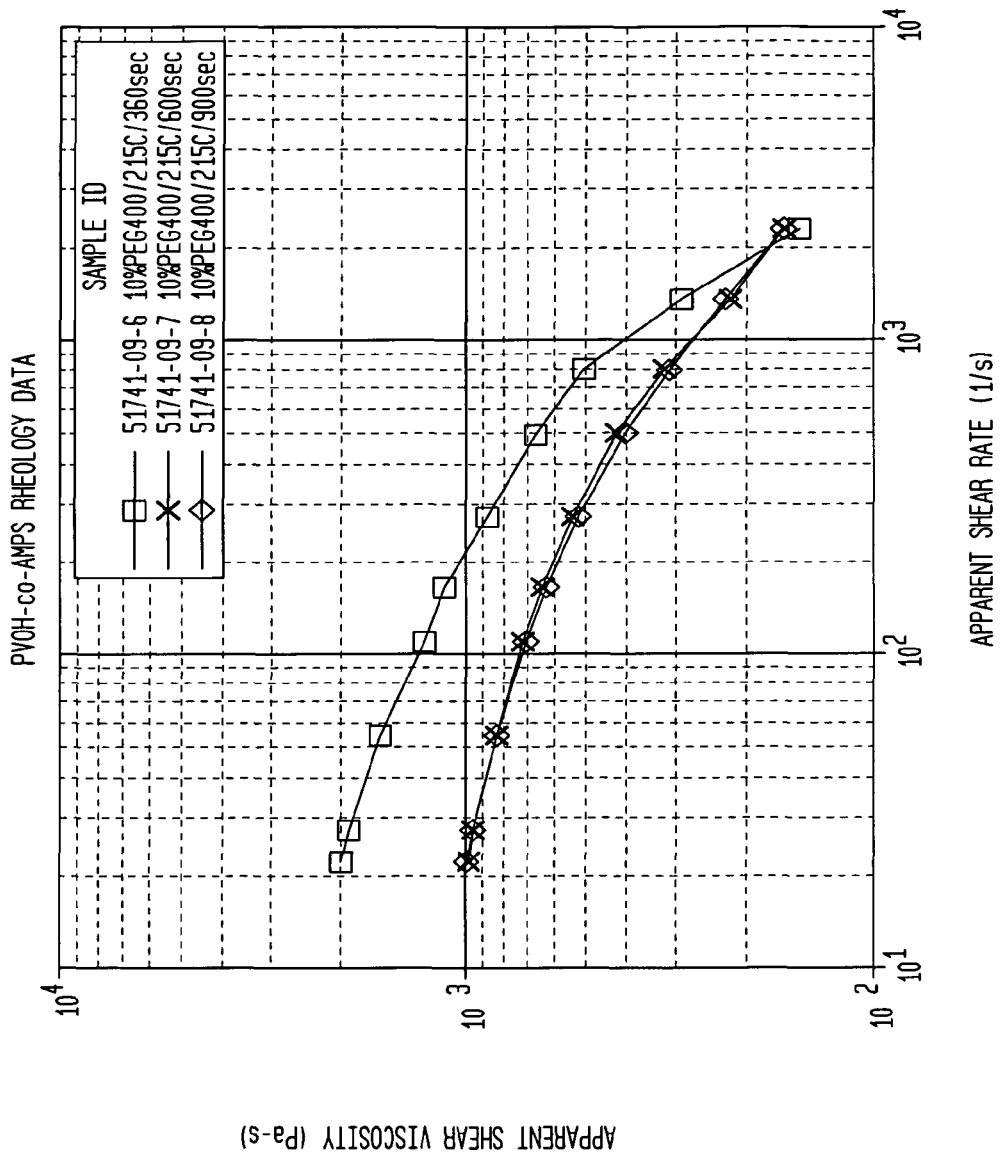

Results Appear in FIGS. 10-12.

FIG. 10 shows viscosity profiles of PVOH/AMPS containing 10% PEG-400 with a melt time of 360 seconds at 195° C., 205° C. and 215° C. and compares it with a like sample containing 15% PEG-400 with a melt time of 360 seconds at 205° C. This data shows that the melt viscosity of the polymer decreases with increasing temperatures but the smooth curve illustrates conventional viscosity to shear rate behavior.

FIG. 11 shows the viscosity profile of PVOH/AMPS containing 10% PEG-400 tested at 215° C. with increasing melt time. The data shows that increasing the melt time from 360 seconds to 600 seconds results in a measurable difference in shear viscosity but a further increase to 900 seconds shows no further decrease in shear viscosity. Additionally a curve testing the same material at 205° C. is included for comparison and shows essentially no difference between the shear viscosity at 205° C. and 215° C. indicating a resistance to increased melt temperature. The lack of difference in shear viscosity between 600 and 900 seconds may be due to some small MW components since water is being eliminated due to the added heating.

FIG. 12 is similar to FIG. 11 except without the data point at 205° C.

It is appreciated from FIGS. 10-12 that the polymer of the invention is readily extruded at temperatures ranging from about 190° C.-220° C.

Additional Uses (1) Barrier Layer

Packaging is very important in today's market. Not only should the packaging be aesthetically appealing to the eye, but it should also be functional and efficient. In particular, packaging should be, among other things, oil and grease resistant. This is important to prevent oil and grease from bleeding through the packaging material, causing leakage and staining. Accordingly, packaging materials such as, for example, paper, paperboard, plastic, fiberglass, canvas or cloth/textile substrates, or the like, are often treated with special coatings that provide oil/grease resistance. Such coated packaging materials are collectively referred to as Oil and Grease Resistant (hereinafter abbreviated "OGR") Papers.

OGR papers are, generally, used for packaging any items that include oil, grease, or other organic solvents. In particular, OGR papers are used in the food industry for producing liners to be applied in packaging items such as pizza boxes, popcorn boxes/bags, microwavable food packaging, butter wraps, bakery items, and fast food wraps (e.g., hamburgers, hot dogs, French fries containers, and so forth). Additional applications of OGR papers may include pet food bags, fireplace starter log wraps, silicone release liners, oil containers, cosmetic packaging, and so forth.

The use of sulfonate-modified PVOH compositions applied by curtain coating to provide a barrier coating to a substrate is described in copending U.S. application Ser. No. 11/316,188 to Miller entitled "Curtain-Coated Polyvinyl Alcohol Oil and Grease Barrier Films" (U.S. Patent Application Publication No. 2006/0099410), the disclosure of which is incorporated in its entirety herein by reference; see Example 38. According to that application, a modified PVOH copolymer provides for a softer and more flexible barrier coating than does a PVOH homopolymer. However, a truly random copolymer produced according to the present invention imparts improved resistance as compared to a "blocky" copolymer. Polyvinyl alcohol groups within the polymer undergo chemical changes that affect the solubility and mechanical properties of the copolymer, as discussed above. The improved barrier properties are due to the random dispersion of sulfonic functionalized comonomer throughout the copolymer, diminishing the impact of polyvinyl alcohol groups on the overall polymer.

A coating or film that is substantially pinhole free provides a more effective oil and grease barrier coating. The following methods are useful in determining the effectiveness of an oil and grease barrier coating. A "TAPPI 559 kit test rating" is a measure of the repellency of a coating to oil and grease and is performed in accordance with TAPPI method T-559 pm-96, or the most recent publication of the method, T-559 cm-02. An effective oil and grease barrier coating may exhibit a TAPPI 559 kit test rating of at least about 7, and preferably at least about 10. "Turpentine Test Value" is a measure of the relative rates at which oils/greases may be expected to penetrate flat or creased papers, and it is performed in accordance with TAPPI method T-454 om-94, or the most recent publication of the method, T-454 om-10. The turpentine test, when performed on a creased coated substrate, is performed on a sample which is creased according to TAPPI Method T-512 sp-96, or the most recent method publication, T-512 sp-07, and unfolded prior to testing. This test is used to determine a turpentine crease test value, which is reported in seconds. "Vegetable Oil Resistance Value" is a measure of the transudation of oily or greasy constituents of products to flexible packages, and it is performed in accordance with a modified version of the TAPPI method T-507 cm-99, or the most recent publication of the method, T-507 cm-09. This test, as well, is performed on flat and creased coated substrate samples. The methods described above are incorporated herein by reference.

The following example further illustrates the invention. PVOH/AMPS oil and grease barrier coating compositions are prepared from resins according to the present invention. Comparative compositions are prepared from conventionally available sulfonic acid-functionalized polyvinyl alcohol. In some formulations, a surfactant is added to assist in maintaining a stable curtain, and in some formulations, a plasticizer is added for improved flexibility of the film. A suitable liquid surfactant is Surfynol SE-F, available from Air Products & Chemicals. A suitable plasticizer is glycerine, available from All Chem. Industries. The coating composition is curtain coated in one or two layers onto the surface of a densified paper substrate having a known basis weight in g/m². Following application of the PVOH/AMPS copolymer compositions, the substrates are dried at multiple stations. Once the substrates are dried, they are subjected to oil and grease resistance testing.

(2) Separator Film for Batteries

A battery separator functions to prevent contact between the anode and the cathode, yet allows the transfer of certain ions that are needed to maintain consistent battery discharge. While the role performed by the battery separator is essentially passive, the design of the separator is important to provide batteries with long and consistent performance, and to substantially eliminate shorts caused by a breach in the separator. Among other requirements, the separator should be able to withstand the harsh environment of the battery, be resistant to attacks by oxidizing agents, allow the transmission of necessary ions, and have a low electrical resistance.

The term "battery" as used herein, refers to any electrochemical device which has anode and cathode components, and generates current by converting chemical energy into electrical energy. The term "battery" may refer to only one electric cell, or to any combination of two or more electric cells. The features of a typical battery include a casing with a positive electrode chamber and a negative electrode chamber, which are divided by a separator. Separators are typically films, fabrics, laminates, or the like, which are interposed between the anode and the cathode and are intended to prevent the battery from shorting.

The use of sulfonic acid-functionalized PVOH films to provide a separator film for an electric battery is described in copending U.S. application Ser. No. 12/313,329 to Vicari et al., entitled "Oxidation Resistant Separator Film for Batteries" (U.S. Patent Application Publication No. 2009/0148758), the disclosure of which is incorporated in its entirety herein by reference. The truly random copolymer of the invention is highly resistant to oxidation by the chemicals used to create an electric charge in a battery, as compared to a more "blocky" copolymer. Polyvinyl alcohol groups within the polymer undergo chemical changes that affect the solubility and mechanical properties of the copolymer, as discussed above. The improved resistance to oxidation is due to the random dispersion of sulfonic functionalized comonomer throughout the copolymer, diminishing the impact of polyvinyl alcohol groups on the overall polymer.

The inventive resin provides for a battery separator which is highly resistant to degradation by oxidation and, thus, substantially eliminates the likelihood of a battery to short-circuit. Very generally, the battery separator of the invention includes an oxidation resistant film or coating comprising the sulfonic acid functionalized vinyl alcohol copolymer of the invention. In addition to the vinyl alcohol copolymer, the oxidation resistant film may also include a saccharide component, which appears to improve the operability of the separator.

There is thus provided a vinyl alcohol copolymer resin consisting essentially of recurring units I, II and III,

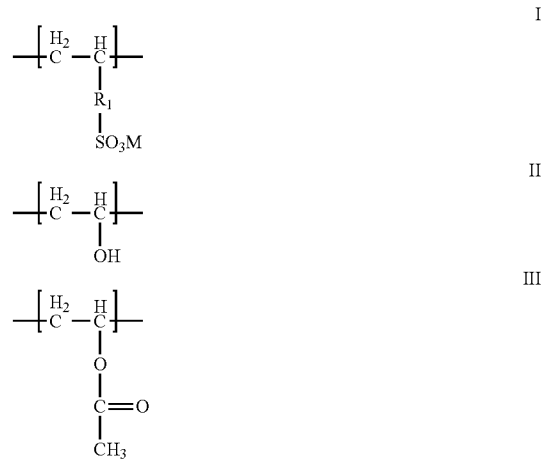

wherein:
- $R_1$ is present or absent and if present is $C_1$-$C_{20}$ alkylene, $C_4$-$C_8$ cycloalkylene, $C_4$-$C_8$ heterocycloalkylene, arylene, heteroarylene, or —C(=O)—NH—$R_2$—, and is preferably —C(=O)—NH—$R_2$—;
- $R_2$ is $C_1$-$C_{10}$ alkylene, $C_4$-$C_8$ cycloalkylene, $C_4$-$C_8$ heterocycloalkylene, arylene, alkylarylene, heteroarylene, alkylheteroarylene, and is preferably a $C_1$-$C_{10}$ alkylene; and
- M is a cationic counterion or hydrogen, preferably hydrogen or a sodium ion.

The vinyl alcohol copolymer resin is characterized by a substantial absence of compositional drift as determined by $^{13}$C NMR spectroscopy. Recurring unit I is generally present in the vinyl alcohol copolymer resin in an amount of from about 0.5 to about 10 mole percent and preferably in an amount of from about 1 to about 8 mole percent. Recurring unit II is generally present in the resin in an amount of from about 75 to about 98 mole percent. Recurring unit III is generally present in an amount of from about 1 to about 20 mole percent and preferably in an amount of from about 1 to about 10 mole percent. The resin is generally characterized by a degree of hydrolysis of from about 70 to about 99+ %. Typically, a 4 weight % aqueous solution of the resin is characterized by a viscosity of about 2 to about 30 cps.

In some embodiments, the inventive vinyl alcohol copolymer resin is characterized by a substantial absence of compositional drift, as evidenced by a unimodal compositional distribution determined using gradient elution chromatographic analysis and is prepared by the following steps. Vinyl acetate monomer, a sulfonic acid-containing comonomer corresponding to recurring unit I, a free radical yielding polymerization initiator, and a solvent for said monomer, comonomer, initiator, and copolymer resulting from the copolymerization of said monomer and comonomer are continuously fed into a first reaction zone to form a reaction mass. The reaction mass is maintained in the first reaction zone under polymerization conditions with agitation for a residence time sufficient for a major proportion of the sulfonic acid-containing comonomer fed to said first reaction zone to polymerize. The reaction mass is continuously fed from the first reaction zone to a second reaction zone. Additional sulfonic acid-containing comonomer is continuously fed to the second reaction zone. The reaction mass is maintained in the second reaction zone under polymerization conditions with agitation for a residence time sufficient to polymerize a major proportion of the sulfonic acid-containing comonomer added to the second reaction zone. The reaction mass is continuously withdrawn from the second reaction zone. A copolymer of vinyl acetate monomer and the sulfonic acid-containing comonomer is separated from the latter reaction mass. A major proportion of the acetate groups in the vinyl acetate-sulfonic acid-containing copolymer is saponified by hydrolysis and/or alcoholysis to form the vinyl alcohol copolymer resin. The ratio of sulfonic acid-containing comonomer fed to the first reaction zone to the sulfonic acid-containing comonomer fed to the second reaction zone is within the range of about 55:45 to about 80:20.

In another embodiment the inventive resin is characterized by a resistance to irreversible dehydration upon exposure to harsh chemicals, as determined by a harsh chemical dissolution test and evidenced by a dissolution time of less than about 100 seconds after 2 weeks of exposure. In this embodiment, recurring unit I is generally present in the vinyl alcohol copolymer resin in an amount of from about 0.5 to about 10 mole percent and preferably from about 1 mole percent to about 5 mole percent. Recurring unit II is generally present in the resin in an amount of from about 75 to about 98 mole percent and preferably from about 85 mole percent to about 95 mole percent. Recurring unit III is generally present in an amount of from about 1 to about 20 mole percent and preferably from about 5 mole percent to about 10 mole percent.

In an alternative embodiment, the inventive resin is characterized by retention of hydroxide functionality upon aging, as determined by infrared (IR) spectra and as evidenced by a peak demonstrating absorption at about 3354 cm$^{-1}$ on the IR spectra after two weeks of aging. In this embodiment, recurring unit I is present in the vinyl alcohol copolymer resin in an amount of from about 0.5 to about 10 mole percent; preferably from about 1 mole percent to about 4 mole percent. Recurring unit II is present in the resin in an amount of from about 75 to about 98 mole percent; and preferably from about 94 mole percent to about 98 mole percent. Recurring unit III is present in an amount of from about 1 to about 20 mole percent; preferably from about 1 mole percent to about 5 mole percent.

In another embodiment, a resin composition is provided for forming a film, coating or package, the composition comprising a saponified copolymer of vinyl acetate and an acrylamido-sulfonic acid monomer, wherein the copolymer is characterized by a substantial absence of compositional drift. In some applications, the resin composition is applied as a coating on a substrate to provide a soft, flexible oil and grease barrier coating. Alternatively, the composition forms a water-soluble package or a film that is resistant to oxidizing chemicals. In some cases, a film is formed from the composition to produce a battery separator which resists degradation by oxidation.

While the invention has been described in connection with several examples, modifications to those examples within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary.

What is claimed is:

1. A vinyl alcohol copolymer resin consisting essentially of recurring units I, II and III,

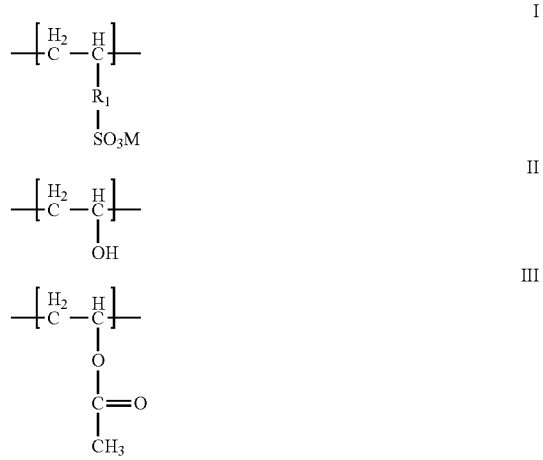

wherein:

$R_1$ is present or absent and if present is $C_1$-$C_{20}$ alkylene, $C_4$-$C_8$ cycloalkylene, $C_4$-$C_8$ heterocycloalkylene, arylene, heteroarylene, or —C(=O)—NH—$R_2$—;

$R_2$ is $C_1$-$C_{10}$ alkylene, $C_4$-$C_8$ cycloalkylene, $C_4$-$C_8$ heterocycloalkylene, arylene, alkylarylene, heteroarylene, or alkylheteroarylene; and M is a cationic counterion or hydrogen;

and wherein:

recurring unit I is present in the vinyl alcohol copolymer resin in an amount of from about 0.5 to about 10 mole percent;

recurring unit II is present in the resin in an amount of from about 75 to about 98 mole percent; and recurring unit III is present in an amount of from about 1 to about 20 mole percent;

wherein the vinyl alcohol copolymer resin is characterized by a substantial absence of compositional drift as determined by $^{13}$C NMR spectroscopy.

2. The resin of claim 1, wherein recurring unit I is present in the vinyl alcohol copolymer resin in an amount of from about 1 to about 8 mole percent.

3. The resin of claim 1, wherein recurring unit III is present in the vinyl alcohol copolymer resin in an amount of from about 1 to about 10 mole percent.

4. The resin of claim 1, wherein the resin is characterized by a degree of hydrolysis of from about 70 to about 99+ %.

5. The resin of claim 1, wherein a 4 weight % aqueous solution of the resin is characterized by a viscosity of about 2 to about 30 cps.

6. The resin of claim 1, wherein $R_1$ is —C(=O)—NH—$R_2$— and $R_2$ is $C_1$-$C_{10}$ alkylene.

7. The resin of claim 1, wherein $R_1$ is absent, such that recurring unit I is

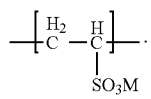

8. The resin of claim 1, wherein M is a hydrogen or a sodium ion.

9. A vinyl alcohol copolymer resin consisting essentially of recurring units I, II and III,

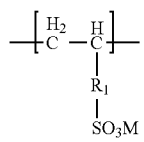 I

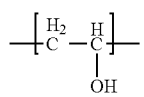 II

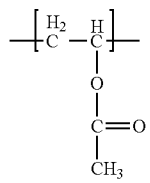 III wherein:
- $R_1$ is present or absent and if present is $C_1$-$C_{20}$ alkylene, $C_4$-$C_8$ cycloalkylene, $C_4$-$C_8$ heterocycloalkylene, arylene, heteroarylene, or —C(=O)—NH—$R_2$—;
- $R_2$ is $C_1$-$C_{10}$ alkylene, $C_4$-$C_8$ cycloalkylene, $C_4$-$C_8$ heterocycloalkylene, arylene, alkylarylene, heteroarylene, or alkylheteroarylene; and
- M is a cationic counterion or hydrogen;

and wherein:
- recurring unit I is present in the vinyl alcohol copolymer resin in an amount of from about 0.5 to about 10 mole percent;
- recurring unit II is present in the resin in an amount of from about 75 to about 98 mole percent; and
- recurring unit III is present in an amount of from about 1 to about 20 mole percent;

and wherein further the vinyl alcohol copolymer resin is prepared by steps including:
(a) continuously feeding vinyl acetate monomer, a sulfonic acid-containing comonomer corresponding to recurring unit I, a free radical yielding polymerization initiator, and a solvent for said monomer, comonomer, initiator, and copolymer resulting from the copolymerization of said monomer and comonomer into a first reaction zone to form a reaction mass;
(b) maintaining the reaction mass in the first reaction zone under polymerization conditions with agitation for a residence time sufficient for a major proportion of the sulfonic acid-containing comonomer fed to said first reaction zone to polymerize;
(c) continuously feeding reaction mass from said first reaction zone to a second reaction zone;
(d) continuously feeding additional sulfonic acid-containing comonomer to the second reaction zone;
(e) maintaining the reaction mass in the second reaction zone under polymerization conditions with agitation for a residence time sufficient to polymerize a major proportion of the sulfonic acid-containing comonomer added to the second reaction zone;
(f) continuously withdrawing reaction mass from the second reaction zone;
(g) separating a copolymer of vinyl acetate monomer and the sulfonic acid-containing comonomer from the latter reaction mass; and
(h) saponifying by hydrolysis and/or alcoholysis a major proportion of the acetate groups in the vinyl acetate-sulfonic acid-containing copolymer to form the vinyl alcohol copolymer resin;

wherein the ratio of sulfonic acid-containing comonomer fed to the first reaction zone to the sulfonic acid-containing comonomer fed to the second reaction zone is within the range of about 55:45 to about 80:20; and wherein the resin is characterized by a substantial absence of compositional drift, as evidenced by a unimodal compositional distribution determined using gradient elution chromatographic analysis.

10. A vinyl alcohol copolymer resin consisting essentially of recurring units I, II and III,

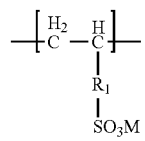 I

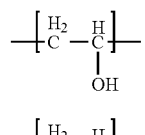 II

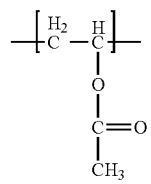 III wherein:
- $R_1$ is present or absent and if present is $C_1$-$C_{20}$ alkylene, $C_4$-$C_8$ cycloalkylene, $C_4$-$C_8$ heterocycloalkylene, arylene, heteroarylene, or —C(=O)—NH—$R_2$—;
- $R_2$ is $C_1$-$C_{10}$ alkylene, $C_4$-$C_8$ cycloalkylene, $C_4$-$C_8$ heterocycloalkylene, arylene, alkylarylene, heteroarylene, or alkylheteroarylene; and
- M is a cationic counterion or hydrogen;

wherein further:
- recurring unit I is present in the vinyl alcohol copolymer resin in an amount of from about 0.5 to about 10 mole percent;
- recurring unit II is present in the resin in an amount of from about 75 to about 98 mole percent; and
- recurring unit III is present in an amount of from about 1 to about 20 mole percent;

and wherein the resin is characterized by a resistance to irreversible dehydration upon exposure to harsh chemicals, as determined by a harsh chemical dissolution test and evidenced by a dissolution time of less than about 100 seconds after 2 weeks of exposure.

11. The resin of claim 10, wherein the recurring unit I is present in the vinyl alcohol copolymer resin in an amount of from about 1 mole percent to about 5 mole percent.

12. The resin of claim 10, wherein the recurring unit II is present in the vinyl alcohol copolymer resin in an amount of from about 85 mole percent to about 95 mole percent.

13. The resin of claim 10, wherein the recurring unit III is present in the vinyl alcohol copolymer resin in an amount of from about 5 mole percent to about 10 mole percent.

14. A vinyl alcohol copolymer resin consisting essentially of recurring units I, II and III,

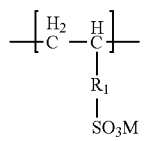  I

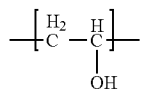  II

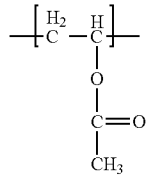  III wherein:
$R_1$ is present or absent and if present is $C_1$-$C_{20}$ alkylene, $C_4$-$C_8$ cycloalkylene, $C_4$-$C_8$ heterocycloalkylene, arylene, heteroarylene, or —C(=O)—NH—$R_2$—;
$R_2$ is $C_1$-$C_{10}$ alkylene, $C_4$-$C_8$ cycloalkylene, $C_4$-$C_8$ heterocycloalkylene, arylene, alkylarylene, heteroarylene, or alkylheteroarylene; and
M is a cationic counterion or hydrogen;

wherein further:
recurring unit I is present in the vinyl alcohol copolymer resin in an amount of from about 0.5 to about 10 mole percent;
recurring unit II is present in the resin in an amount of from about 75 to about 98 mole percent; and
recurring unit III is present in an amount of from about 1 to about 20 mole percent;
and wherein the resin is characterized by retention of hydroxide functionality upon aging, as determined by infrared (IR) spectra and as evidenced by a peak demonstrating absorption at about 3354 cm$^{-1}$ on the IR spectra after two weeks of aging.

15. The resin of claim 14, wherein recurring unit I is present in the vinyl alcohol copolymer resin in an amount of from about 1 mole percent to about 4 mole percent.

16. The resin of claim 14, wherein recurring unit II is present in the vinyl alcohol copolymer resin in an amount of from about 94 mole percent to about 98 mole percent.

17. The resin of claim 14, wherein recurring unit III is present in the vinyl alcohol copolymer resin in an amount of from about 1 mole percent to about 5 mole percent.

18. A resin composition for forming a film, coating or package, the composition comprising a saponified copolymer of vinyl acetate and an acrylamido-sulfonic acid monomer, wherein the copolymer is characterized by a substantial absence of compositional drift.

19. The resin composition of claim 18, wherein a substrate is coated with the composition to provide a soft, flexible oil and grease barrier coating.

20. The resin composition of claim 18, wherein a water-soluble package or a film is formed from the composition, and wherein the water-soluble package or film is resistant to oxidizing chemicals.

21. The resin composition of claim 18, wherein a film is formed from the composition to produce a battery separator which resists degradation by oxidation.

* * * * *